(12) United States Patent
Wang

(10) Patent No.: US 12,498,608 B2
(45) Date of Patent: Dec. 16, 2025

(54) ELECTROCHROMIC DEVICE AND MANUFACTURING METHOD

(71) Applicant: SHENZHEN GUANGYI TECH CO., LTD., Shenzhen (CN)

(72) Inventor: Kun Wang, Shenzhen (CN)

(73) Assignee: SHENZHEN GUANGYI TECH CO., LTD., Shenzhen (CN)

( * ) Notice: Subject to any disclaimer, the term of this patent is extended or adjusted under 35 U.S.C. 154(b) by 798 days.

(21) Appl. No.: 17/787,419

(22) PCT Filed: Dec. 28, 2020

(86) PCT No.: PCT/CN2020/139822
§ 371 (c)(1),
(2) Date: Jun. 20, 2022

(87) PCT Pub. No.: WO2021/136124
PCT Pub. Date: Aug. 7, 2021

(65) Prior Publication Data
US 2023/0034675 A1 Feb. 2, 2023

(30) Foreign Application Priority Data
Jan. 3, 2020 (CN) .......................... 202010006223.4

(51) Int. Cl.
*G02F 1/155* (2006.01)
*B23K 26/364* (2014.01)
(Continued)

(52) U.S. Cl.
CPC .......... *G02F 1/1533* (2013.01); *B23K 26/364* (2015.10); *C23C 14/042* (2013.01); *C23C 14/5873* (2013.01); *G02F 2202/16* (2013.01)

(58) Field of Classification Search
CPC .... G02F 1/1533; G02F 2202/16; G02F 1/155; G02F 1/15; G02F 1/1525; G02F 1/153;
(Continued)

(56) References Cited

U.S. PATENT DOCUMENTS

2005/0168794 A1 8/2005 Fanton et al.
2010/0302053 A1 12/2010 Karlson et al.
(Continued)

FOREIGN PATENT DOCUMENTS

CN 202563220 U 11/2012
CN 104834146 A 8/2015
(Continued)

OTHER PUBLICATIONS

International Search report with English Translation for PCT Application No. PCT/CN2020/139822, dated Mar. 17, 2021, 7 pages.

*Primary Examiner* — Balram T Parbadia
(74) *Attorney, Agent, or Firm* — Dickinson Wright PLLC

(57) ABSTRACT

The electrochromic device includes a first transparent substrate, a first transparent conductive layer, an ion storage layer, an ion transfer layer, an electrochromic layer, a second transparent conductive layer, and a second transparent substrate which are sequentially stacked, where the first transparent conductive layer includes at least two first conductive portions, the second transparent conductive layer includes at least two second conductive portions, and an extension direction of the at least two first conductive portions and an extension direction of the at least two second conductive portions are configured to intersect with each other.

10 Claims, 14 Drawing Sheets

(51) Int. Cl.
*C23C 14/04* (2006.01)
*C23C 14/58* (2006.01)
*G02F 1/153* (2006.01)

(58) Field of Classification Search
CPC ..... G02F 1/163; B23K 26/364; C23C 14/042; C23C 14/5873; C23C 14/58
See application file for complete search history.

(56) References Cited

U.S. PATENT DOCUMENTS

| | | | | |
|---|---|---|---|---|
| 2011/0043887 | A1* | 2/2011 | Valentin | B32B 17/10376 359/275 |
| 2013/0293825 | A1* | 11/2013 | Trajkovska | G02F 1/153 351/44 |
| 2015/0192835 | A1* | 7/2015 | Kim | G09G 3/32 345/589 |
| 2016/0018713 | A1* | 1/2016 | Dubarry | G02F 1/153 359/265 |
| 2016/0349589 | A1 | 12/2016 | Sun et al. | |
| 2019/0018315 | A1* | 1/2019 | Liang | G03F 7/0007 |
| 2019/0137841 | A1* | 5/2019 | Koo | G09G 3/38 |
| 2020/0073190 | A1* | 3/2020 | Zhang | G02F 1/1516 |
| 2021/0088865 | A1* | 3/2021 | Ko | G02F 1/1524 |
| 2021/0382365 | A1* | 12/2021 | Gogotsi | C01B 32/921 |

FOREIGN PATENT DOCUMENTS

| | | |
|---|---|---|
| CN | 105467711 A | 4/2016 |
| CN | 108519710 A | 9/2018 |
| CN | 108828870 A | 11/2018 |
| CN | 111323979 A | 6/2020 |
| JP | 2003066075 A | 3/2003 |
| JP | 2009048072 A | 3/2009 |
| KR | 20010028520 A | 4/2001 |
| KR | 20170083683 A | 7/2017 |

* cited by examiner

ELECTROCHROMIC DEVICE AND MANUFACTURING METHOD

CROSS-REFERENCE TO RELATED APPLICATION(S)

This is a national stage application filed under 37 U.S.C. 371 based on International Patent Application No. PCT/CN2020/139822, filed Dec. 28, 2020, which claims priority to Chinese Patent Application No. 202010006223.4 filed with the China National Intellectual Property Administration (CNIPA) on Jan. 3, 2020, the disclosures of which are incorporated herein by reference in its entirety.

TECHNICAL FIELD

The present application relates to the electrochromic field and, in particular, to an electrochromic device and a method for preparing the electrochromic device.

BACKGROUND

With the development of various display technologies, the market demand for a system in which opacity is adjustable locally is increasing. For example, the system in which the opacity is adjustable locally is applicable to a head-mounted display. Local opacity is increased such that light from a specified object is weakened or blocked, thereby increasing the contrast of computer-generated virtual content displayed above the object, implementing augmented reality, and displaying virtual reality. Electrochromic devices may have a stable and reversible change in color and/or transmittance under an applied electric field, which are widely used in consumer electronics. However, all regions where color changes are needed are continuously filled with conductive layers on two sides of an existing electrochromic device. Therefore, a local color change cannot be implemented, which limits the application of the electrochromic device in the system in which the opacity is adjustable locally.

SUMMARY

The present application provides an electrochromic device and a method for preparing the electrochromic device, so as to achieve the effect of adjusting local opacity. In addition, the position and area of a local color change region can be conveniently adjusted. Thus, the application of the electrochromic device to a system in which opacity is adjustable locally is facilitated.

In a first aspect, an electrochromic device is provided in an embodiment of the present application. The electrochromic device includes a first transparent substrate, a first transparent conductive layer, an ion storage layer, an ion transfer layer, an electrochromic layer, a second transparent conductive layer, and a second transparent substrate which are sequentially stacked, where the first transparent conductive layer includes at least two first conductive portions, the second transparent conductive layer includes at least two second conductive portions, and an extension direction of the first conductive portion and an extension direction of the second conductive portion are configured to intersect with each other.

The direction along which the first transparent substrate points to the second transparent substrate is a vertical direction, a region where projections of each first conductive portion and each second conductive portion in the vertical direction overlap corresponds to one local electrochromic device unit, and it is to be understood that multiple first conductive portions and multiple second conductive portions divide an entire electrochromic device into several local electrochromic device units; each local electrochromic device unit may be controlled to change a color independently (a color change referred to throughout the present application includes a color change and a transparency change) so that the position of a local color change region can be conveniently adjusted; or multiple local electrochromic device units may be selected to change colors simultaneously so that the position and area of the local color change region can be conveniently adjusted. Therefore, for the electrochromic device in the present application, the preceding structural design of conductive layers is provided so that the electrochromic device is conveniently controlled to change a color locally and the position and area of the local color change region can be conveniently adjusted.

The first transparent conductive layer and the second transparent conductive layer include the at least two first conductive portions and the at least two second conductive portions, respectively. Optionally, the first transparent substrate includes at least two first transparent substrate region portions, where a projection of each first transparent substrate region portion on the first transparent conductive layer coincides with a respective first conductive portion; and/or the second transparent substrate includes at least two second transparent substrate region portions, where a projection of each second transparent substrate region portion on the second transparent conductive layer coincides with a respective second conductive portion; and/or the ion storage layer includes at least two ion storage region portions, where a projection of each ion storage region portion on the first transparent conductive layer coincides with a respective first conductive portion, or a projection of each ion storage region portion on the second transparent conductive layer coincides with a respective second conductive portion; and/or the ion transfer layer includes at least two ion transfer region portions, where a projection of each ion transfer region portion on the first transparent conductive layer coincides with a respective first conductive portion, or a projection of each ion transfer region portion on the second transparent conductive layer coincides with a respective second conductive portion; and/or the electrochromic layer includes at least two electrochromic region portions, where a projection of each electrochromic region portion on the first transparent conductive layer coincides with a respective first conductive portion, or a projection of each electrochromic region portion on the second transparent conductive layer coincides with a respective second conductive portion. In addition to the preceding structural design separately performed on the first transparent conductive layer and the second transparent conductive layer, other structural layers of the electrochromic device of the present application may be further divided into region portions together or separately. Since a transparent conductive layer is generally relatively thin, a process of separately dividing an entire transparent conductive layer into at least two conductive portions requires relatively high accuracy. One or more layers close to the transparent conductive layer are also divided into portions, thereby greatly reducing the requirements on the accuracy of the process, facilitating the reduction of a manufacturing difficulty, and greatly improving the production efficiency of a product.

Optionally, the first transparent conductive layer and the second transparent conductive layer each have a thickness of 0.1 nanometer to 10 micrometers, preferably 1 nanometer to 1 micrometer.

Optionally, an included angle between the extension direction of the first conductive portion and the extension direction of the second conductive portion is 0 degrees to 90 degrees; when the included angle between the extension direction of the first conductive portion and the extension direction of the second conductive portion is 0 degrees, the first conductive portion and the second conductive portion are parallel to each other; and preferably, the included angle between the extension direction of the first conductive portion and the extension direction of the second conductive portion is 10 degrees to 90 degrees. Shapes, sizes, and the like of the first conductive portion and the second conductive portion are not specifically limited in the embodiment of the present application and may be adjusted according to the requirements of a usage scenario. For example, the first conductive portion and the second conductive portion may be each a rectangle, part of a circular ring, or a wavy strip. Optionally, the multiple first conductive portions may have the same size or different sizes, and the multiple second conductive portions may have the same size or different sizes.

Optionally, each first conductive portion is separately connected to at least one transparent wire, and each second conductive portion is separately connected to at least one transparent wire.

Optionally, one or more transparent wires may be connected to each first conductive portion. When multiple transparent wires are connected, a uniform color change effect of a local region corresponding to the first conductive portion can also be achieved.

Optionally, one or more transparent wires may be connected to each second conductive portion. When multiple transparent wires are connected, a uniform color change effect of a local region corresponding to the second conductive portion can also be achieved.

The transparent wire in the embodiment of the present application may be led out from the outer side of the first conductive portion/the second conductive portion, which is a lead-out manner in the existing art.

A lead-out manner of a third conductive portion in the present application may also be used.

Optionally, a groove is further included between the at least two first conductive portions and/or between the at least two second conductive portions, where at least one transparent wire is further disposed in the groove between the at least two first conductive portions and/or between the at least two second conductive portions, and the at least one transparent wire is connected to a side face of the first conductive portion and/or the second conductive portion.

Optionally, a groove penetrating through the first transparent substrate, the first transparent conductive layer, the electrochromic layer, the ion transfer layer, and the ion storage layer and reaching the second conductive portion is disposed, and a transparent wire connected to the second conductive portion is further included in the groove penetrating through the first transparent substrate, the first transparent conductive layer, the electrochromic layer, the ion transfer layer, and the ion storage layer and reaching the second conductive portion; and/or a groove penetrating through the second transparent substrate, the second transparent conductive layer, the ion storage layer, the ion transfer layer, and the electrochromic layer and reaching the first conductive portion is disposed, and a transparent wire connected to the first conductive portion is further included in the groove penetrating through the second transparent substrate, the second transparent conductive layer, the ion storage layer, the ion transfer layer, and the electrochromic layer and reaching the first conductive portion.

In a second aspect, a method for preparing an electrochromic device is provided in an embodiment of the present application. The method includes steps described below.

At least two first conductive portions of a first subunit body are prepared by a mask method or a laser method, where the first subunit body includes a first transparent substrate, a first transparent conductive layer, and an ion storage layer which are sequentially stacked.

At least two second conductive portions of a second subunit body are prepared by the mask method or the laser method, where the second subunit body includes an electrochromic layer, a second transparent conductive layer, and a second transparent substrate which are sequentially stacked.

An ion transfer layer is laminated with the first subunit body and the second subunit body, where an extension direction of the at least two first conductive portions of the first subunit body and an extension direction of the at least two second conductive portions of the second subunit body are configured to intersect with each other.

The preceding three steps may be performed in any sequence in the embodiment of the present application, that is, the at least two first conductive portions of the first subunit body and the at least two second conductive portions of the second subunit body may be prepared, and then the first subunit body, the ion transfer layer, and the second subunit body may be laminated; alternatively, the first subunit body, the ion transfer layer, and the second subunit body may be laminated, and then the at least two first conductive portions of the first subunit body and the at least two second conductive portions of the second subunit body may be prepared.

In the step of preparing the at least two first conductive portions of the first subunit body, the first transparent conductive layer is divided into the at least two first conductive portions by the mask method or the laser method; and in the step of preparing the at least two second conductive portions of the second subunit body, the second transparent conductive layer is divided into the at least two second conductive portions by the mask method or the laser method. Optionally, in the step of preparing the at least two first conductive portions of the first subunit body, the first transparent substrate may be further divided into at least two first transparent substrate region portions by the mask method or the laser method, and/or the ion storage layer may be further divided into at least two ion storage region portions by the mask method or the laser method.

Additionally/alternatively, in the step of preparing the at least two second conductive portions of the second subunit body, the second transparent substrate may be further divided into at least two second transparent substrate region portions by the mask method or the laser method, and/or the electrochromic layer may be further divided into at least two electrochromic region portions by the mask method or the laser method.

Additionally/alternatively, in the step of laminating the ion transfer layer with the first subunit body and the second subunit body, the ion transfer layer may be further divided into at least two ion transfer region portions by the mask method or the laser method.

Optionally, the method for preparing an electrochromic device further includes steps described below.

At least one transparent wire connected to a respective first conductive portion is prepared, and at least one transparent wire connected to a respective second conductive portion is prepared.

Optionally, the step in which the at least one transparent wire connected to a respective first conductive portion is prepared, and the at least one transparent wire connected to a respective second conductive portion is prepared includes a step described below.

The transparent wire is deposited at a preset position on the first transparent substrate and/or the second transparent substrate by the mask method.

Optionally, the step in which the at least one transparent wire connected to a respective first conductive portion is prepared, and the at least one transparent wire connected to a respective second conductive portion is prepared includes steps described below.

The second transparent substrate, the second transparent conductive layer, the electrochromic layer, the ion transfer layer, and the ion storage layer are etched through in sequence by the laser method to the first conductive portion so that a groove penetrating through the second transparent substrate, the second transparent conductive layer, the electrochromic layer, the ion transfer layer, and the ion storage layer and reaching the first conductive portion is formed, and a transparent wire is connected to the first conductive portion through the groove.

Additionally/alternatively, the first transparent substrate, the first transparent conductive layer, the ion storage layer, the ion transfer layer, and the electrochromic layer are etched through in sequence by the laser method to the second conductive portion so that a groove penetrating through the first transparent substrate, the first transparent conductive layer, the ion storage layer, the ion transfer layer, and the electrochromic layer and reaching the second conductive portion is formed, and a transparent wire is connected to the second conductive portion through the groove.

In a third aspect, an electrochromic device is provided in an embodiment of the present application. The electrochromic device includes a third transparent substrate, a third transparent conductive layer, an ion storage layer, an ion transfer layer, an electrochromic layer, a fourth transparent conductive layer, and a fourth transparent substrate which are sequentially stacked, where the third transparent conductive layer includes multiple third conductive portions arranged in a matrix and the fourth transparent conductive layer is a single conductive portion covering the fourth transparent substrate, or the third transparent conductive layer is a single conductive portion covering the third transparent substrate and the fourth transparent conductive layer includes multiple fourth conductive portions arranged in a matrix.

Optionally, the third transparent conductive layer is the single conductive portion covering the third transparent substrate and the fourth transparent conductive layer is the single conductive portion covering the fourth transparent substrate.

The direction along which the third transparent substrate points to the fourth transparent substrate is a vertical direction, a region where a projection of each third conductive portion in the vertical direction overlaps corresponds to one local electrochromic device unit, and it is to be understood that the multiple third conductive portions divide an entire electrochromic device into multiple local electrochromic device units; or the direction along which the fourth transparent substrate points to the third transparent substrate is a vertical direction, a region where a projection of each fourth conductive portion in the vertical direction overlaps corresponds to one local electrochromic device unit, and it is to be understood that the multiple fourth conductive portions divide an entire electrochromic device into multiple local electrochromic device units; and each local electrochromic device unit may be controlled to change a color independently so that the position and area of a local color change region can be conveniently adjusted. Therefore, for the electrochromic device in the present application, the preceding structural design of conductive layers is provided so that the electrochromic device is conveniently controlled to change a color locally and the position and area of the local color change region can be conveniently adjusted.

The third transparent conductive layer includes at least two third conductive portions. Optionally, the third transparent substrate includes at least two third transparent substrate region portions, where a projection of each third transparent substrate region portion on the third transparent conductive layer coincides with a respective third conductive portion; and/or the ion storage layer includes at least two ion storage region portions, where a projection of each ion storage region portion on the third transparent conductive layer coincides with a respective third conductive portion; and/or the ion transfer layer includes at least two ion transfer region portions, where a projection of each ion transfer region portion on the third transparent conductive layer coincides with a respective third conductive portion; and/or the electrochromic layer includes at least two electrochromic region portions, where a projection of each electrochromic region portion on the third transparent conductive layer coincides with a respective third conductive portion. In addition to the preceding structural design separately performed on the third transparent conductive layer, other structural layers of the electrochromic device of the present application may be further divided into region portions together or separately. Since a transparent conductive layer is generally relatively thin, a process of separately dividing an entire transparent conductive layer into at least two conductive portions requires relatively high accuracy. One or more layers close to the transparent conductive layer are also divided into portions, thereby greatly reducing the requirement on the accuracy of the process, facilitating the reduction of a manufacturing difficulty, and greatly improving the production efficiency of a product.

Optionally, a shape of the third conductive portion is not specifically limited and may include a regular or irregular polygon or/and a curvilinear shape, preferably a regular hexagon, a rectangle, or a parallelogram. A size of the third conductive portion is not specifically limited in the embodiment of the present application and may be adjusted according to the requirements of a usage scenario. Optionally, the multiple third conductive portions may have the same size or different sizes.

Optionally, a groove is further included between the at least two third conductive portions and/or between the at least two fourth conductive portions, where at least one transparent wire is disposed in the groove and connected to a side face of the third conductive portion and/or the fourth conductive portion.

Optionally, the electrochromic device further includes a groove penetrating through the fourth transparent substrate, the fourth transparent conductive layer, the electrochromic layer, the ion transfer layer, and the ion storage layer and reaching the third conductive portion, or a groove penetrating through the third transparent substrate, the third transparent conductive layer, the ion storage layer, the ion transfer layer, and the electrochromic layer and reaching the fourth conductive portion.

A transparent wire connected to the third conductive portion is further included in the groove penetrating through the fourth transparent substrate, the fourth transparent conductive layer, the electrochromic layer, the ion transfer layer, and the ion storage layer and reaching the third conductive portion. Alternatively, a transparent wire connected to the fourth conductive portion is further included in the groove penetrating through the third transparent substrate, the third transparent conductive layer, the ion storage layer, the ion transfer layer, and the electrochromic layer and reaching the fourth conductive portion.

Optionally, the transparent wire is connected to the third conductive portion or the fourth conductive portion in manners described below.

A head of the transparent wire is connected to a side face, a lower bottom face, or an upper face of the third conductive portion or a side face, a lower bottom face, or an upper face of the fourth conductive portion, or a head of the transparent wire is inserted into the third conductive portion or the fourth conductive portion, and a main body of the transparent wire is led out from a gap between two adjacent third conductive portions or a gap between two adjacent fourth conductive portions. Thus, the contact between the main body of the transparent wire and another third conductive portion or another fourth conductive portion can be avoided, and a single transparent wire is connected to a single third conductive portion or a single fourth conductive portion.

Alternatively, a head of the transparent wire is connected to a lower bottom face of the third conductive portion or a lower bottom face of the fourth conductive portion, or a head of the transparent wire is inserted into the third conductive portion or the fourth conductive portion, and a main body of the transparent wire is led out from the bottom of the third transparent conductive layer, and an insulating layer covers an outer side of the main body of the transparent wire. When the insulating layer covers the outer side of the main body of the transparent wire (the insulating layer does not cover the head), electricity will not be conducted between the transparent wire and another third conductive portion or another fourth conductive portion, and a single transparent wire is connected to a single third conductive portion or a single fourth conductive portion.

Alternatively, a head of the transparent wire passes through the fourth transparent substrate, the fourth transparent conductive layer, the electrochromic layer, the ion transfer layer, and the ion storage layer from a side of the fourth transparent substrate and is connected to an upper face of the third conductive portion or inserted into the third conductive portion; or a head of the transparent wire passes through the third transparent substrate, the third transparent conductive layer, the ion storage layer, the ion transfer layer, and the electrochromic layer from a side of the third transparent substrate and is connected to an upper face of the fourth conductive portion or inserted into the fourth conductive portion. Thus, a single transparent wire can also be connected to a single third conductive portion or a single fourth conductive portion.

Optionally, one or more transparent wires may be connected to each third conductive portion or each fourth conductive portion. When multiple transparent wires are connected, a uniform color change effect of a local region corresponding to the third conductive portion or the fourth conductive portion can also be achieved.

Optionally, the transparent wire is connected to the single conductive portion formed by the third transparent conductive layer or the single conductive portion formed by the fourth transparent conductive layer in a manner described below.

A head of the transparent wire is connected to an outer edge of the single conductive portion formed by the third transparent conductive layer or an outer edge of the single conductive portion formed by the fourth transparent conductive layer. Since the single conductive portion formed by the third transparent conductive layer or the single conductive portion formed by the fourth transparent conductive layer is an entire single conductive portion, the wire of the single conductive portion can be led out in a lead-out manner in the existing art.

Optionally, one or more transparent wires may be connected to each single conductive portion formed by the third transparent conductive layer or each single conductive portion formed by the fourth transparent conductive layer. When multiple transparent wires are connected, the transfer impedance of a current may be reduced, a speed at which electrons reach a local region may be increased, and a color change speed of the local region may be increased.

Optionally, the third transparent conductive layer and the fourth transparent conductive layer each have a thickness of 0.1 nanometer to 10 micrometers, preferably 1 nanometer to 1 micrometer.

In a fourth aspect, a method for preparing an electrochromic device is provided in an embodiment of the present application. The method includes steps described below.

Multiple third conductive portions of a third subunit body which are arranged in a matrix are prepared by a mask method or a laser method, where the third subunit body includes a third transparent substrate, a third transparent conductive layer, and an ion storage layer which are sequentially stacked.

Alternatively, multiple fourth conductive portions of a fourth subunit body which are arranged in a matrix are prepared by a mask method or a laser method, where the fourth subunit body includes a fourth transparent substrate, a fourth transparent conductive layer, and an electrochromic layer which are sequentially stacked.

An ion transfer layer is laminated with the third subunit body and the fourth subunit body.

The preceding two steps may be performed in any sequence in the embodiment of the present application, that is, the multiple third conductive portions of the third subunit body which are arranged in the matrix may be prepared, and then the ion transfer layer may be laminated with the third subunit body and the fourth subunit body; or the ion transfer layer may be laminated with the third subunit body and the fourth subunit body, and then the multiple third conductive portions of the third subunit body which are arranged in the matrix may be prepared.

Optionally, when the third subunit body includes the third transparent substrate, the third transparent conductive layer, and the ion storage layer which are sequentially stacked, in the step of preparing the multiple third conductive portions of the third subunit body which are arranged in the matrix, in addition to the division of the third transparent conductive layer into the multiple third conductive portions, the third transparent substrate may be further divided into multiple third transparent substrate region portions by the mask method or the laser method, and/or the ion storage layer may be further divided into multiple ion storage region portions by the mask method or the laser method. When the third subunit body includes the third transparent substrate, the third transparent conductive layer, and the electrochromic layer which are sequentially stacked, in the step of preparing the multiple third conductive portions of the third subunit body which are arranged in the matrix, in addition to the division of the third transparent conductive layer into the multiple third conductive portions, the third transparent substrate may be further divided into multiple third transparent substrate region portions by the mask method or the laser method, and/or the electrochromic layer may be further divided into multiple electrochromic region portions by the mask method or the laser method.

Additionally/alternatively, in the step of laminating the ion transfer layer with the third subunit body and the fourth subunit body, the ion transfer layer may be further divided into multiple ion transfer region portions by the mask method or the laser method, and/or the ion storage layer/the electrochromic layer may be further divided into multiple ion storage region portions/electrochromic region portions by the mask method or the laser method.

Optionally, the method further includes steps described below.

A groove penetrating through the fourth transparent substrate, the fourth transparent conductive layer, the electrochromic layer, the ion transfer layer, and the ion storage layer and reaching the third conductive portion is prepared by the laser method, and a transparent wire is connected to the third conductive portion through the groove.

Alternatively, a groove penetrating through the third transparent substrate, the third transparent conductive layer, the ion storage layer, the ion transfer layer, and the electrochromic layer and reaching the fourth conductive portion is prepared by the laser method, and a transparent wire is connected to the fourth conductive portion through the groove.

Optionally, at least one transparent wire connected to a respective third conductive portion is prepared, and at least one transparent wire connected to a respective fourth conductive portion is prepared.

In the embodiment of the present application, the transparent wire connected to the third conductive portion and/or the fourth conductive portion is prepared by multiple methods described below.

Optionally, in one preparation manner, the step of preparing the at least one transparent wire connected to each third conductive portion includes a step described below.

The transparent wire is deposited at a preset position on the third transparent substrate by the mask method; or the transparent wire is deposited at a preset position on the fourth transparent substrate by the mask method. Specifically, the third transparent substrate is covered with a mask provided with a preset hollow-out position, where a preset hollow-out shape is the same as a shape in which the transparent wire is distributed; the transparent wire is prepared through evaporation so that the transparent wire can be formed at the preset hollowed-out position of the mask after the mask is removed. Preferably, an outer side of a main body of the transparent wire may further be covered with an insulating layer, which is performed by the following method: the insulating layer is deposited on the outer side of the main body of the transparent wire (the insulating layer is not deposited on a head of the transparent wire) by the mask method, or an insulating mask may be used for directly covering the main body of the transparent wire. This manner of preparing the transparent wire is applicable to the electrochromic device using the process of preparing the multiple conductive portions of the third subunit body and then laminating the ion transfer layer with the third subunit body and the fourth subunit body.

Optionally, in another preparation manner, the step of preparing the at least one transparent wire connected to each third conductive portion includes a step described below.

The groove penetrating through the fourth transparent substrate, the fourth transparent conductive layer, the ion storage layer, the ion transfer layer, and the electrochromic layer is formed from a side of the fourth transparent substrate, and the head of the transparent wire is connected to an upper face of the third conductive portion or inserted into the third conductive portion through the groove. This manner of preparing the transparent wire is applicable to the electrochromic device using the process of preparing the multiple conductive portions of the third subunit body and then laminating the ion transfer layer with the third subunit body and the fourth subunit body. In addition, this manner of preparing the transparent wire is also applicable to the electrochromic device using the process of laminating the ion transfer layer with the third subunit body and the fourth subunit body and then preparing the multiple conductive portions of the third subunit body. The main body of the third conductive portion is led out from the side of the fourth transparent substrate, and when the multiple conductive portions are cut and prepared by the laser method, the transparent wire will not be cut off.

In a fifth aspect, an electronic display device is further provided in an embodiment of the present application. The electronic display device includes a structure of any one of the preceding electrochromic devices. The electronic display device includes, but is not limited to, sunglasses, ski goggles, a VR/AR device, glasses, goggles, a magnifier, a rear-view mirror, a curtain wall, architectural glass, a display screen, an electronic book, or the like, each of which includes the electrochromic device in the present application.

Compared with the existing art, the present disclosure has beneficial effects described below.

In the present application, the extension direction of the first conductive portion and the extension direction of the second conductive portion are configured to intersect with each other, thereby implementing the local color change of the electrochromic device and achieving the effect of adjusting local opacity. In addition, the position and area of the local color change region can be conveniently adjusted.

In the present application, the third conductive portions arranged in the matrix and the integral fourth transparent conductive layer are disposed, thereby implementing the local color change of the electrochromic device and achieving the effect of adjusting local opacity. In addition, the position and area of the local color change region can be conveniently adjusted. Thus, the present application facilitates the application of the electrochromic device to the system in which the opacity is adjustable locally.

BRIEF DESCRIPTION OF DRAWINGS

Exemplary embodiments of the present application will be described below in detail with reference to drawings such that the preceding features and advantages and other features and advantages of embodiments of the present application are more apparent to those of ordinary skill in the art. In the drawings.

DETAILED DESCRIPTION

Figure 1:
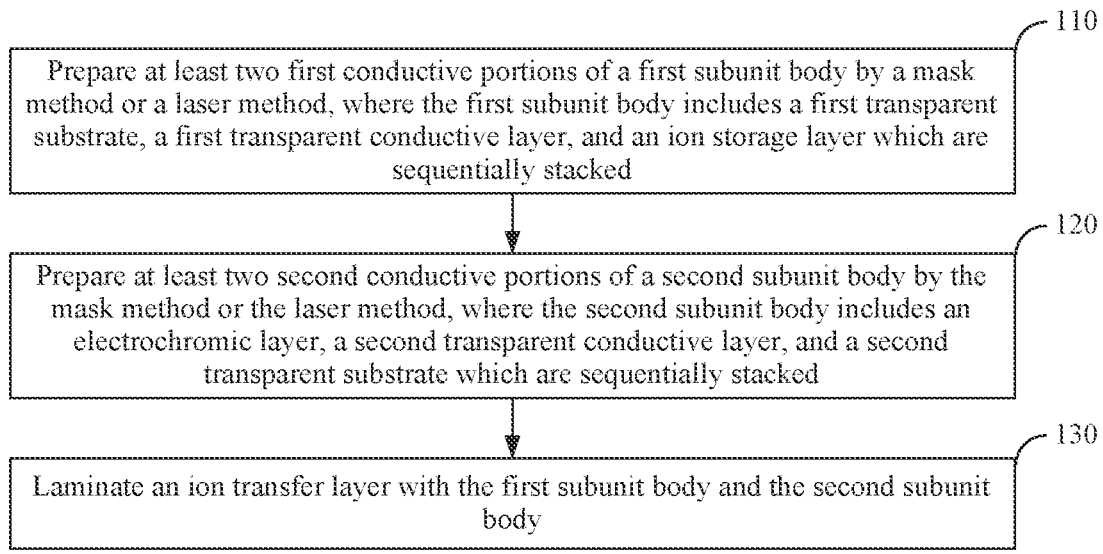
FIG. 1 is a flowchart of a method for preparing an electrochromic device according to embodiment one of the present application.

The technical solutions of the present application are further described below through embodiments in conjunction with drawings. It is to be understood that the embodiments described herein are intended to illustrate and not to limit the present application. Additionally, it is to be noted that the embodiments described herein are merely part, not all, of the embodiments of the present application. Based on the embodiments in the present application, all other embodiments obtained by those of ordinary skill in the art without creative work are within the scope of the present application.

Unless otherwise defined, all technical and scientific terms used herein have the same meanings as those commonly understood by those skilled in the art to which the present application pertains. The terms used in the specification of the present application are only used for describing embodiments and not intended to limit the present application. The term "and/or" used herein includes any or all combinations of one or more listed associated items.

Furthermore, the terms "first", "second", and the like may be used herein to describe various directions, actions, steps, elements, or the like, but these directions, actions, steps, or elements are not limited by these terms. These terms are merely used for distinguishing one direction, action, step, or element from another direction, action, step, or element. The second conductive portion and the second conductive portion are both conductive portions but are not the same conductive portion. The terms "first", "second", and the like are not to be construed as indicating or implying relative importance or implicitly indicating the number of technical features as indicated. Thus, a feature defined as a "first" feature or a "second" feature may explicitly or implicitly includes one or more such features. As described in the present application, the term "a plurality of" is defined as at least two, for example, two, three, or the like, unless otherwise expressly limited.

Before the exemplary embodiments are discussed in more detail, it is to be noted that some of the exemplary embodiments are described as processing or methods depicted in flowcharts. Although the flowcharts describe the steps as sequentially processed, many of the steps may be implemented concurrently, coincidently, or simultaneously. Additionally, the sequence of the steps may be rearranged. The processing may be terminated when operations of the processing are completed, but may further have additional steps not included in the drawings.

Embodiment One

FIG. 1 is a flowchart of a method for preparing an electrochromic device according to embodiment one of the present application. The method specifically includes steps described below.

In step 110, at least two first conductive portions of a first subunit body are prepared by a mask method or a laser method, where the first subunit body includes a first transparent substrate, a first transparent conductive layer, and an ion storage layer which are sequentially stacked.

In this embodiment, the preparation of the at least two first conductive portions of the first subunit body by the mask method includes steps described below.

In step A1, the first transparent conductive layer is prepared on the first transparent substrate by the mask method, where the first transparent conductive layer includes the at least two first conductive portions.

In this step, specifically, the first transparent substrate is covered with a mask, and the first transparent conductive layer is formed by a magnetron sputtering method, vacuum vapor deposition, a sol-gel process, a chemical vapor deposition method, or the like. After the mask is removed, the at least two first conductive portions and a groove between two adjacent first conductive portions may be obtained.

In step A2, the ion storage layer is formed on the at least two first conductive portions.

Exemplarily, the ion storage layer may be formed on the at least two first conductive portions by a coating method.

Figure 2:
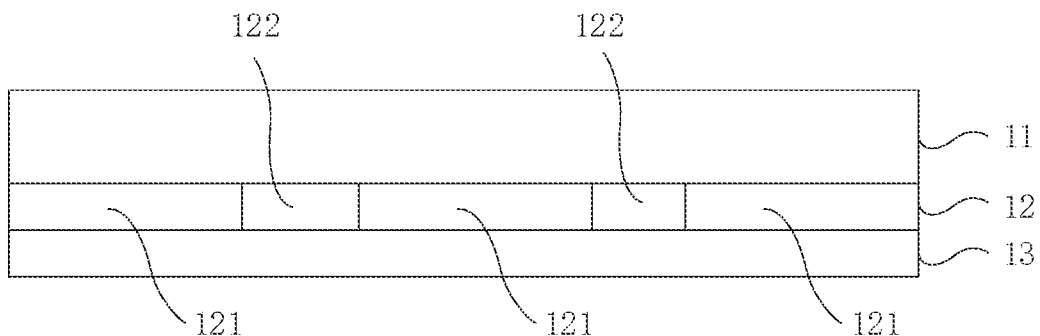
FIG. 2 is a structural diagram of a first subunit body with first conductive portions prepared according to embodiment one of the present application.

In this embodiment, referring to FIG. 2, the structure obtained through steps A1 and A2 includes a first transparent substrate 11, a first transparent conductive layer 12, and an ion storage layer 13 which are sequentially stacked, where the first transparent conductive layer 12 includes at least two first conductive portions 121, and a groove 122 is further included between two adjacent first conductive portions 121.

In other embodiments, the first transparent substrate may be covered with the mask, and the first transparent conductive layer and the ion storage layer are formed by the magnetron sputtering method, the vacuum vapor deposition, the sol-gel process, the chemical vapor deposition method, or the like. After the mask is removed, a groove penetrating through the first transparent conductive layer and the ion storage layer may be obtained, and the groove may further divide the first transparent conductive layer into the at least two first conductive portions.

In this embodiment, exemplarily, the preparation of the at least two first conductive portions of the first subunit body by the laser method includes steps described below.

In step B1, the first transparent conductive layer is prepared on the first transparent substrate.

In step B2, the first transparent conductive layer is cut by a laser such that the first transparent conductive layer is divided into the at least two first conductive portions.

In step B3, the ion storage layer is formed on the first conductive portions.

In this embodiment, the structure obtained through steps B1 to B3 is the same as the structure obtained through steps A1 and A2, and specifically, reference may be made to FIG. 2.

In this embodiment, exemplarily, the preparation of the at least two first conductive portions of the first subunit body by the laser method includes steps described below.

In step C1, the first transparent conductive layer is prepared on the first transparent substrate.

In step C2, the ion storage layer is formed on the first transparent conductive layer.

In step C3, the first transparent conductive layer and the ion storage layer are cut by the laser such that the first transparent conductive layer is divided into the at least two first conductive portions.

Figure 3:
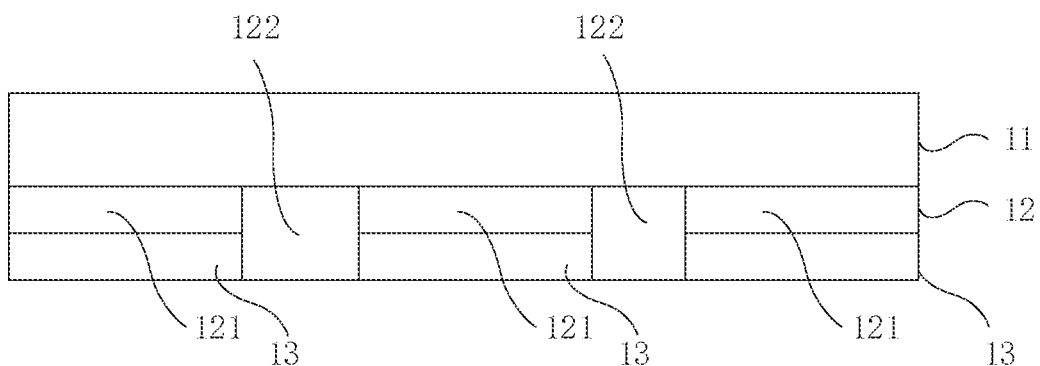
FIG. 3 is a structural diagram of a first subunit body with first conductive portions prepared according to embodiment one of the present application.

In this embodiment, referring to FIG. 3, the structure obtained through steps C1 to C3 includes the first transparent substrate 11, the first transparent conductive layer 12, and the ion storage layer 13 which are sequentially stacked, where the first transparent conductive layer 12 includes the at least two first conductive portions 121, and the groove 122 is further included between the two adjacent first conductive portions 121. The groove 122 further penetrates through the ion storage layer 13. When a conductive layer is cut by the laser method and a conductive layer is relatively thin (having a thickness of 0.1 micrometer to 10 micrometers), it is difficult to adjust the accuracy of laser cutting. Therefore, the first transparent conductive layer and the ion storage layer are simultaneously cut by the laser so that the overall cutting thickness is increased, the difficulty of the laser cutting can be reduced, and the yield of the laser cutting can be improved.

In this embodiment, exemplarily, the preparation of the at least two first conductive portions of the first subunit body by the laser method includes a step described below.

In step D1, the first transparent substrate and the first transparent conductive layer are cut by the laser such that the first transparent conductive layer is divided into the at least two first conductive portions.

Figure 4:
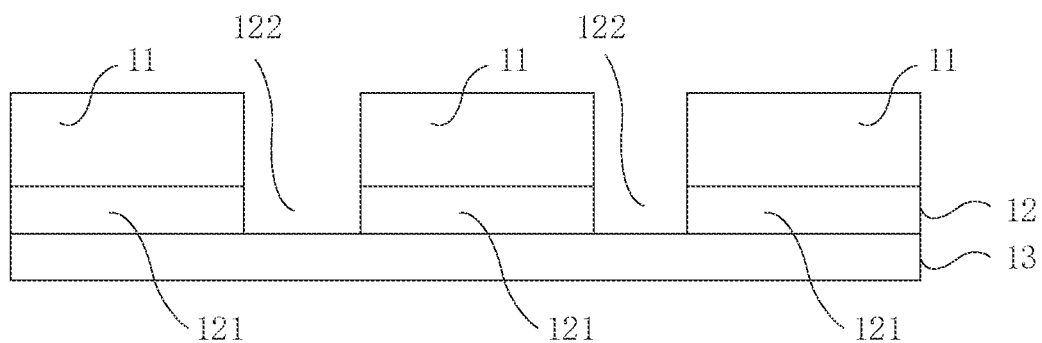
FIG. 4 is a structural diagram of a first subunit body with first conductive portions prepared according to embodiment one of the present application.

In this embodiment, referring to FIG. 4, the structure obtained through step D1 includes the first transparent substrate 11, the first transparent conductive layer 12, and the ion storage layer 13 which are sequentially stacked, where the first transparent conductive layer 12 includes the at least two first conductive portions 121, and the groove 122 is further included between the two adjacent first conductive portions 121. The groove 122 further penetrates through the first transparent substrate 11. The first transparent conductive layer and the first transparent substrate are simultaneously cut by the laser so that the overall cutting thickness is increased, the difficulty of the laser cutting can be reduced, and the yield of the laser cutting can be improved. In other embodiments, the first transparent substrate, the first transparent conductive layer, and the ion storage layer may also be cut by the laser such that the first transparent conductive layer is divided into the at least two first conductive portions, and the groove between the two adjacent first conductive portions further penetrates through the first transparent substrate and the ion storage layer.

In step 120, at least two second conductive portions of a second subunit body are prepared by the mask method or the laser method, where the second subunit body includes an electrochromic layer, a second transparent conductive layer, and a second transparent substrate which are sequentially stacked.

In this embodiment, the preparation of the at least two second conductive portions of the second subunit body by the mask method includes steps described below.

In step E1, the second transparent conductive layer is prepared on the second transparent substrate by the mask method, where the second transparent conductive layer includes the at least two second conductive portions.

In this step, specifically, the second transparent substrate is covered with the mask, and the second transparent conductive layer is formed by the magnetron sputtering method, the vacuum vapor deposition, the sol-gel process, the chemical vapor deposition method, or the like. After the mask is removed, the at least two second conductive portions and a groove between two adjacent second conductive portions may be obtained.

In step E2, the electrochromic layer is formed on the at least two second conductive portions.

Exemplarily, the electrochromic layer may be formed on the at least two second conductive portions by the coating method.

Figure 5:
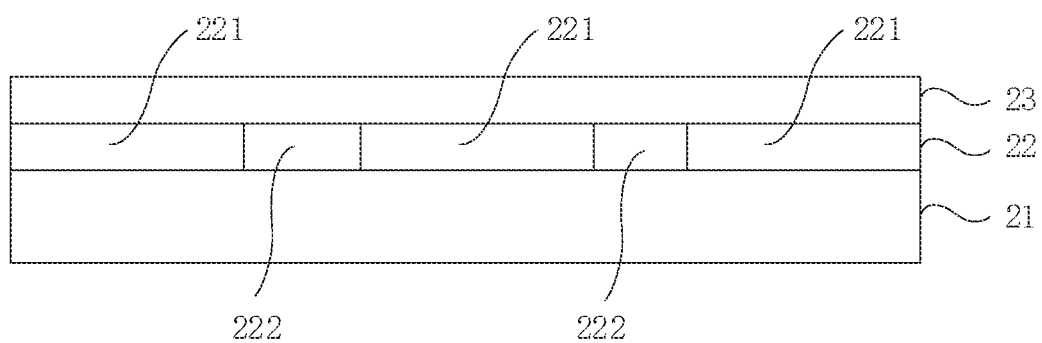
FIG. 5 is a structural diagram of a second subunit body with second conductive portions prepared according to embodiment one of the present application.

In this embodiment, referring to FIG. 5, the structure obtained through steps E1 and E2 includes a second transparent substrate 21, a second transparent conductive layer 22, and an electrochromic layer 23 which are sequentially stacked, where the second transparent conductive layer 22 includes at least two second conductive portions 221, and a groove 222 is further included between two adjacent second conductive portions 221.

In other embodiments, the second transparent substrate may be covered with the mask, and the second transparent conductive layer and the electrochromic layer are formed by the magnetron sputtering method, the vacuum vapor deposition, the sol-gel process, the chemical vapor deposition method, or the like. After the mask is removed, a groove penetrating through the second transparent conductive layer and the electrochromic layer may be obtained, and the groove may further divide the second transparent conductive layer into the at least two second conductive portions.

In this embodiment, exemplarily, the preparation of the at least two second conductive portions of the second subunit body by the laser method includes steps described below.

In step F1, the second transparent conductive layer is prepared on the second transparent substrate.

In step F2, the second transparent conductive layer is cut by the laser such that the second transparent conductive layer is divided into the at least two second conductive portions.

In step F3, the electrochromic layer is formed on the second conductive portions.

In this embodiment, the structure obtained through steps F1 to F3 is the same as the structure obtained through steps E1 and E2, and specifically, reference may be made to FIG. 5.

In this embodiment, exemplarily, the preparation of the at least two second conductive portions of the second subunit body by the laser method includes steps described below.

In step G1, the second transparent conductive layer is prepared on the second transparent substrate.

In step G2, the electrochromic layer is formed on the second transparent conductive layer.

In step G3, the second transparent conductive layer and the electrochromic layer are cut by the laser such that the second transparent conductive layer is divided into the at least two second conductive portions.

Figure 6:
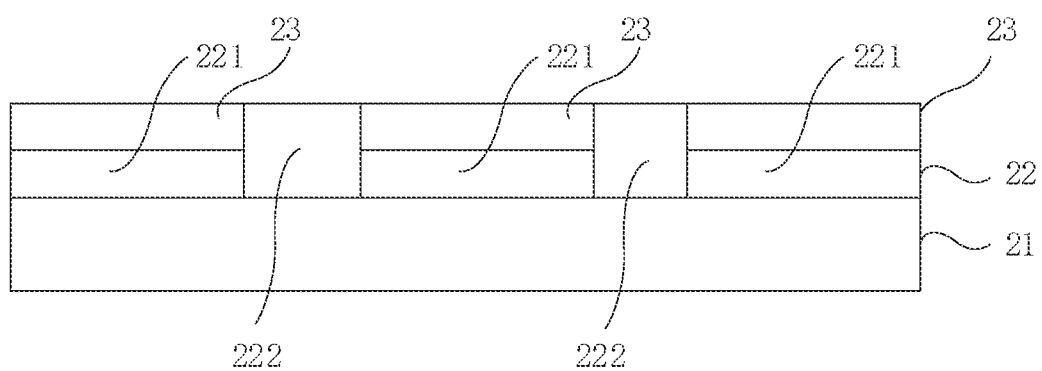
FIG. 6 is a structural diagram of a second subunit body with second conductive portions prepared according to embodiment one of the present application.

In this embodiment, referring to FIG. 6, the structure obtained through steps G1 to G3 includes the second transparent substrate 21, the second transparent conductive layer 22, and the electrochromic layer 23 which are sequentially stacked, where the second transparent conductive layer 22 includes the at least two second conductive portions 221, and the groove 222 is further included between the two adjacent second conductive portions 221. The groove 222 further penetrates through the electrochromic layer 23. When a conductive portion is cut by the laser method and a conductive layer is relatively thin (having a thickness of 0.1 micrometer to 10 micrometers), it is difficult to adjust the accuracy of the laser cutting. Therefore, the second transparent conductive layer and the electrochromic layer are simultaneously cut by the laser so that the overall cutting thickness is increased, the difficulty of the laser cutting can be reduced, and the yield of the laser cutting can be improved.

In this embodiment, exemplarily, the preparation of the at least two second conductive portions of the second subunit body by the laser method includes a step described below.

In step H1, the second transparent substrate and the second transparent conductive layer are cut by the laser such that the second transparent conductive layer is divided into the at least two second conductive portions.

Figure 7:
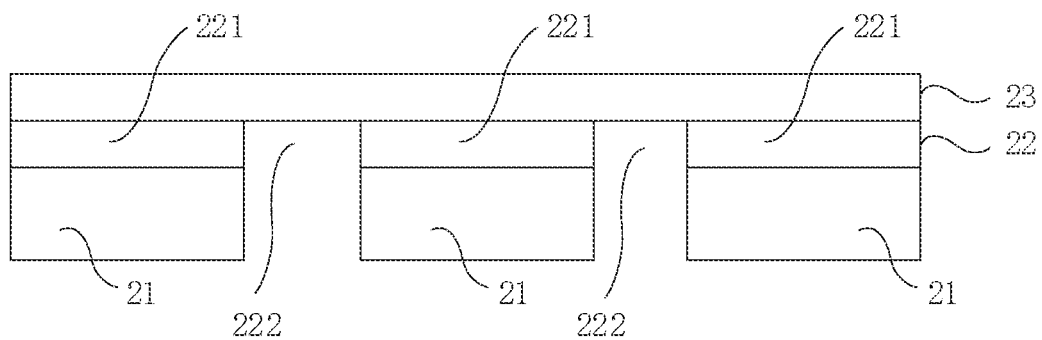
FIG. 7 is a structural diagram of a second subunit body with second conductive portions prepared according to embodiment one of the present application.

In this embodiment, referring to FIG. 7, the structure obtained through step H1 includes the second transparent substrate 21, the second transparent conductive layer 22, and the electrochromic layer 23 which are sequentially stacked, where the second transparent conductive layer 22 includes the at least two second conductive portions 221, and the groove 222 is further included between the two adjacent second conductive portions 221. The groove 222 further penetrates through the second transparent substrate 21. The second transparent conductive layer and the second transparent substrate are simultaneously cut by the laser so that the overall cutting thickness is increased, the difficulty of the laser cutting can be reduced, and the yield of the laser cutting can be improved. In other embodiments, the second transparent substrate, the second transparent conductive layer, and the electrochromic layer may also be cut by the laser such that the second transparent conductive layer is divided into the at least two second conductive portions, and the groove between the two adjacent second conductive portions further penetrates through the second transparent substrate and the electrochromic layer.

In step 130, an ion transfer layer is laminated with the first subunit body and the second subunit body.

In this embodiment, an extension direction of the at least two first conductive portions of the first subunit body and an extension direction of the at least two second conductive portions of the second subunit body are configured to intersect with each other.

In this embodiment, the preceding ion transfer layer is a gel electrolyte layer, a liquid electrolyte layer, or a solid electrolyte layer. The ion transfer layer is laminated with the first subunit body and the second subunit body in multiple manners. Exemplarily, an adhesive frame may be prepared on the ion storage layer of the first subunit body or the electrochromic layer of the second subunit body, and the first subunit body and the second subunit body may be bonded to each other and then a liquid or gel electrolyte may be injected. Alternatively, the ion transfer layer may be coated on the ion storage layer of the first subunit body, covered with the electrochromic layer of the second subunit body, and heated or subjected to an ultraviolet lamp to be solidified, and the solidified ion transfer layer may connect the first subunit body to the second subunit body. Alternatively, the ion transfer layer may be coated on the electrochromic layer of the second subunit body, covered with the ion storage layer of the first subunit body, and subjected to the ultraviolet lamp to be solidified, and the solidified ion transfer layer may connect the first subunit body to the second subunit body. When the ion transfer layer is covered with the electrochromic layer of the second subunit body, the extension direction of the at least two first conductive portions of the first subunit body and the extension direction of the at least two second conductive portions of the second subunit body need to be maintained in the state of intersecting with each other, where an included angle between the extension direction of the first conductive portion and the extension direction of the second conductive portion is 30 degrees to 90 degrees. In other embodiments, when the ion transfer layer is covered with the electrochromic layer of the second subunit body, conductive portion lead-out positions also need to be reserved at an end of each of the at least two first conductive portions in the extension direction and at an end of each of the at least two second conductive portions in the extension direction, where wires are welded at the conductive portion lead-out positions.

In this embodiment, step 110, step 120, and step 130 may be performed in any sequence. In the finally obtained structure, the first subunit body is any subunit body which includes the at least two first conductive portions and is obtained in step 110, and the second subunit body is any subunit body which includes the at least two second conductive portions and is obtained in step 120. Exemplarily, step 130 may be performed before step 110 and/or step 120, where step 110 and step 120 may be performed sequentially or simultaneously.

Specifically, the ion transfer layer is laminated with the first subunit body and the second subunit body, where the first subunit body includes the first transparent substrate, the first transparent conductive layer, and the ion storage layer which are sequentially stacked; and the second subunit body includes the second transparent substrate, the second transparent conductive layer, and the electrochromic layer which are sequentially stacked. After the lamination, the formed structure includes the first transparent substrate, the first transparent conductive layer, the ion storage layer, the ion transfer layer, the electrochromic layer, the second transparent conductive layer, and the second transparent substrate which are sequentially stacked. Then, at least the first transparent substrate and the first transparent conductive layer of the first subunit body and the second transparent substrate and the second transparent conductive layer of the second subunit body are cut simultaneously or separately by the laser method. The structure formed after cutting by the laser method includes the first transparent substrate, the first transparent conductive layer, the ion storage layer, the ion transfer layer, the electrochromic layer, the second transparent conductive layer, and the second transparent substrate which are sequentially stacked, where the first transparent conductive layer includes the at least two first conductive portions, the second transparent conductive layer includes the at least two second conductive portions, and the extension direction of the first conductive portion and the extension direction of the second conductive portion are configured to intersect with each other. A first groove is included between the at least two first conductive portions, which further penetrates through the first transparent substrate of the first subunit body; and a second groove is further included between the at least two second conductive portions, which further penetrates through the second transparent substrate of the second subunit body.

In other embodiments, the first transparent substrate, the first transparent conductive layer, and the ion storage layer may be simultaneously cut when the first subunit body is cut by the laser method; and the second transparent substrate, the second transparent conductive layer, and the electrochromic layer may be cut simultaneously when the second subunit body is cut by the laser method. Therefore, the first groove may also penetrate through the first transparent substrate, the first transparent conductive layer, and the ion storage layer at the same time; and the second groove may also penetrate through the second transparent substrate, the second transparent conductive layer, and the electrochromic layer at the same time.

In this embodiment, the structure of the electrochromic device obtained through step 110, step 120, and step 130 includes the first transparent substrate, the first transparent conductive layer, the ion storage layer, the ion transfer layer, the electrochromic layer, the second transparent conductive layer, and the second transparent substrate which are sequentially stacked, where the first transparent conductive layer includes the at least two first conductive portions, the second transparent conductive layer includes the at least two second conductive portions, and the extension direction of the first conductive portion and the extension direction of the second conductive portion are configured to intersect with each other.

In this embodiment, the first transparent substrate and the second transparent substrate are each made of a flexible material or a rigid material. When the first transparent substrate and the second transparent substrate are each made of the flexible material, the entire electrochromic device may be arbitrarily bent and may be machined on a structure with a curved surface. Exemplarily, the curved surface is a surface of an ophthalmic lens.

In this embodiment, the included angle between the extension direction of the first conductive portion and the extension direction of the second conductive portion is 30 degrees to 90 degrees. The first transparent conductive layer and the second transparent conductive layer each have a thickness of 0.1 nanometer to 10 micrometers, preferably 1 nanometer to 1 micrometer. The first transparent conductive layer and the second transparent conductive layer are each independently formed from indium tin oxide (ITO), aluminum zinc oxide (AZO), fluorine-doped tin oxide (FTO), silver nanowires, graphene, carbon nanotubes (CNTs), metal meshes, or silver nanoparticles.

In this embodiment, the ion storage layer has a thickness of 1 nanometer to 10000 nanometers. A material of the ion storage layer includes any one or a combination of at least two of oxides or complexes which are formed from metal elements in seven subgroups and group VIII and store ions during an electrochemical reaction. Preferably, the metal includes any one or a combination of at least two of titanium, vanadium, niobium, tantalum, chromium, molybdenum, tungsten, manganese, iron, cobalt, iridium, nickel, copper, or zinc. Preferably, the complex includes one or a combination of at least two of Prussian green, Prussian white, Prussian brown, Prussian blue, $KFeFe(CN)_6$, FeNiHCF, FeHCF, NiHCF, or an iron compound $X_mY_n\{Fe(CN)_6\}$, where X is $Na^+$ or $K^+$ and Y is $Fe^{3+}$, $Ni^+$, $Zn^{2+}$, or $Cu^{2+}$. Exemplarily, the material of the ion storage layer may be a metal oxide, a combination of more than two preceding metal oxides, a metal complex, a combination of more than two preceding metal complexes, or a combination of a metal complex and a metal oxide.

In this embodiment, the electrochromic layer has a thickness of 1 nanometer to 10000 nanometers. A color change of the electrochromic layer may be adjusted according to the type of an electrochromic material. For example, the color change of the electrochromic layer may be a change between black and transparency, a change between black and red, a change between black and yellow, or the like. Preferably, the electrochromic layer is made of a material whose transparency is adjustable. A material of the electrochromic layer is selected from one or a combination of at least two of an electrochromic metal oxide such as a tungsten oxide, poly (decylviologen) and its derivatives, polyaniline and its derivatives, polypyrrole and its derivatives, polythiophene and its derivatives, poly(3,4-ethylenedioxythiophene) and its derivatives, poly(thieno[3,4-b][1,4]dioxepane) and its derivatives, polyfuran and its derivatives, polyfluorene and its derivatives, or polycarbazole and its derivatives and/or a copolymer formed by a monomer or an oligomer of the preceding polymer with an electron-deficient monomer. Preferably, the electron-deficient monomer includes any one or a combination of at least two of benzothiadiazole, benzoselenadiazole, benzoxazole, benzotriazole, benzimidazole, quinoxaline, or diketopyrrolopyrrole.

In this embodiment, the ion transfer layer has a thickness of 0.1 micrometer to 200 micrometers. The ion transfer layer is the gel electrolyte layer, the liquid electrolyte layer, or the solid electrolyte layer. Preferably, the ion transfer layer is the solid electrolyte layer.

Figure 8:
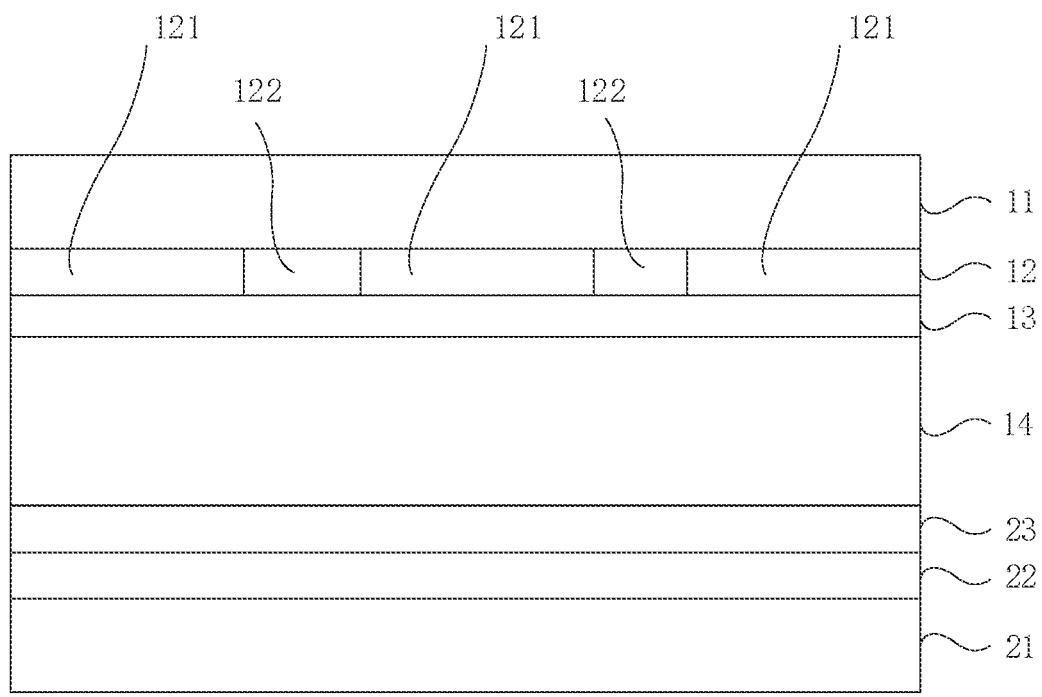
FIG. 8 is a front view of a structure of an electrochromic device according to embodiment one of the present application.
Figure 9:
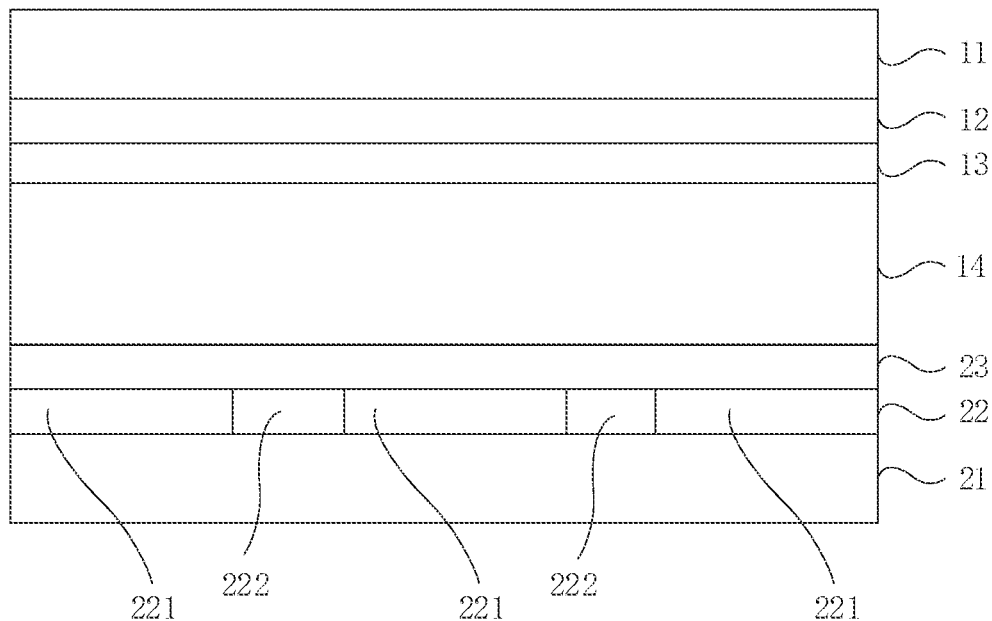
FIG. 9 is a left or right view of a structure of an electrochromic device according to embodiment one of the present application.

For example, the least two first conductive portions of the first subunit body are prepared by the mask method in step 110, the at least two second conductive portions of the first subunit body are prepared by the mask method in step 120, and the included angle between the extension direction of the first conductive portion and the extension direction of the second conductive portion is 90 degrees. Reference is made to FIGS. 8 and 9, where FIG. 8 is a front view of the electrochromic device, and FIG. 9 is a right view of the electrochromic device. The structure of the electrochromic device includes the first transparent substrate 11, the first transparent conductive layer 12, the ion storage layer 13, the ion transfer layer, the electrochromic layer 23, the second transparent conductive layer, and the second transparent substrate 21 which are sequentially stacked, where the first transparent conductive layer 12 includes the at least two first conductive portions 121, the second transparent conductive layer 22 includes the at least two second conductive portions 221, and the extension direction of the first conductive portion 121 and the extension direction of the second conductive portion 221 are configured to be perpendicular to each other. An end of the first conductive portion 121 in the extension direction is further connected to a wire; and an end of the second conductive portion 221 in the extension direction is further connected to a wire. In other embodiments, the groove 122 between the at least two first conductive portions 121 also penetrates through the first transparent substrate 11 or the ion storage layer 13, and the groove 222 between the at least two second conductive portions 221 also penetrates through the second transparent substrate 21 or the electrochromic layer 23, which are not limited here.

Figure 10:
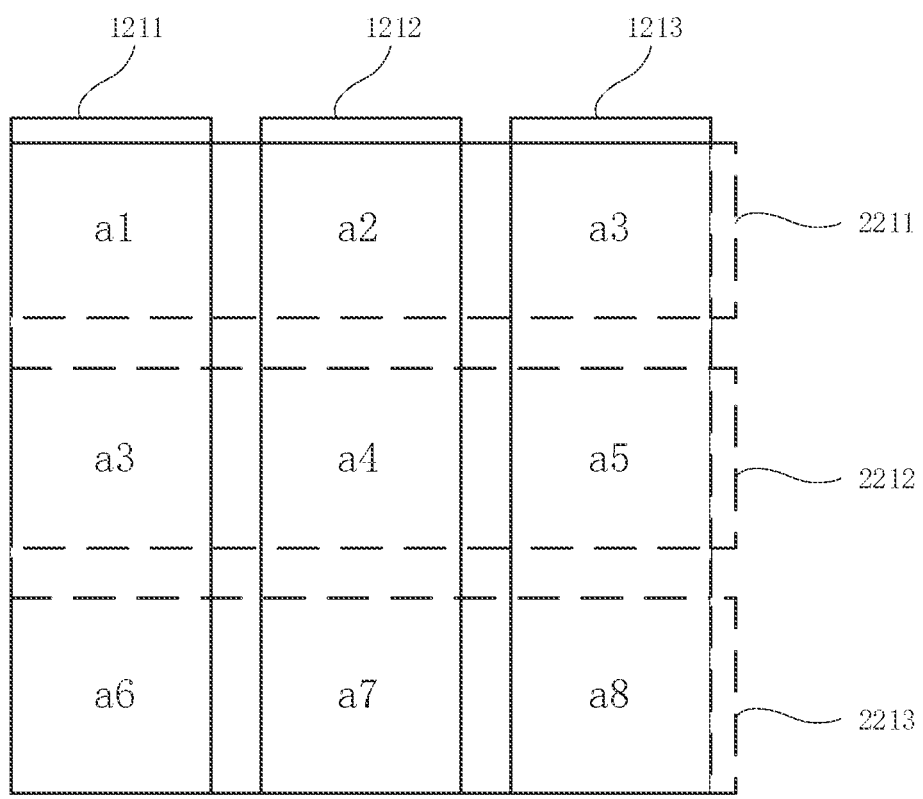
FIG. 10 is a top view of a structure of an electrochromic device according to embodiment one of the present application.

Exemplarily, referring to FIG. 10 which is a top view of the electrochromic device, if the electrochromic device is controlled to be bright in a local region, for example, regions a1, a2, a3, and a4 need to be controlled to be bright, first conductive portions 1211 corresponding to regions a1 and a3 and first conductive portions 1212 corresponding to regions a2 and a4 are connected to a positive electrode (or a negative electrode) of a power supply, and second conductive portions 2211 corresponding to regions a1 and a2 and second conductive portions 2212 corresponding to regions a3 and a4 are connected to the negative electrode (or the positive electrode) of the power supply.

According to the technical solution in this embodiment, the electrochromic device and the method for preparing the electrochromic device are provided. The extension direction of the first conductive portion and the extension direction of the second conductive portion are configured to intersect with each other, thereby implementing a local color change of the electrochromic device and achieving the effect of adjusting local opacity. In addition, the position and area of a local color change region can be conveniently adjusted. Thus, the application of the electrochromic device to a system in which opacity is adjustable locally is facilitated.

Figure 11:
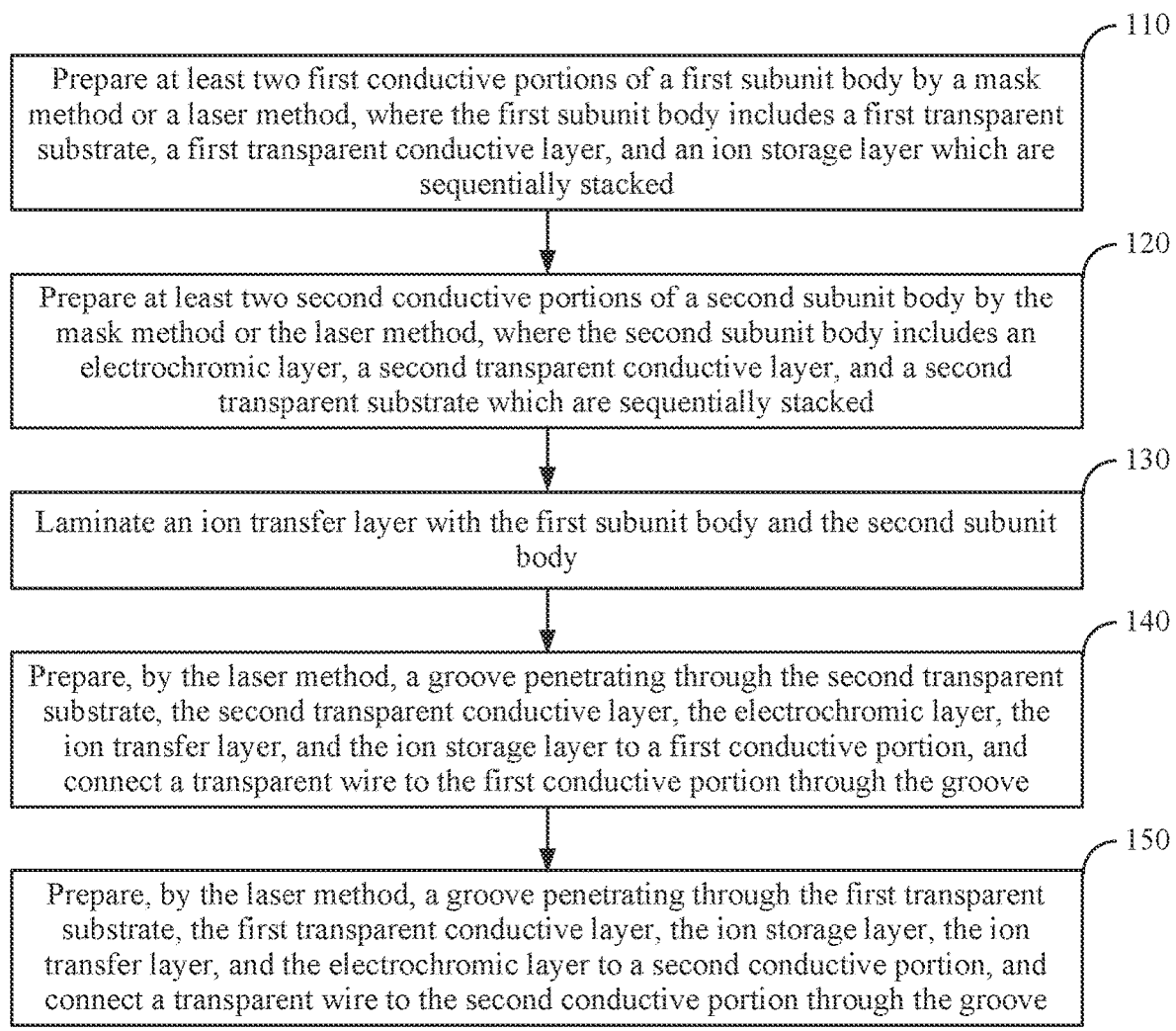
FIG. 11 is a flowchart of a method for preparing wires of an electrochromic device according to embodiment one of the present application.

In an alternative embodiment, referring to FIG. 11, after step 110, step 120, and/or step 130, the following steps are further included.

In step 140, a groove penetrating through the second transparent substrate, the second transparent conductive layer, the electrochromic layer, the ion transfer layer, and the ion storage layer and reaching the first conductive portion is prepared by the laser method, and a transparent wire is connected to the first conductive portion through the groove.

Additionally/alternatively, in step 150, a groove penetrating through the first transparent substrate, the first transparent conductive layer, the ion storage layer, the ion transfer layer, and the electrochromic layer and reaching the second conductive portion is prepared by the laser method, and a transparent wire is connected to the second conductive portion through the groove.

Figure 12:
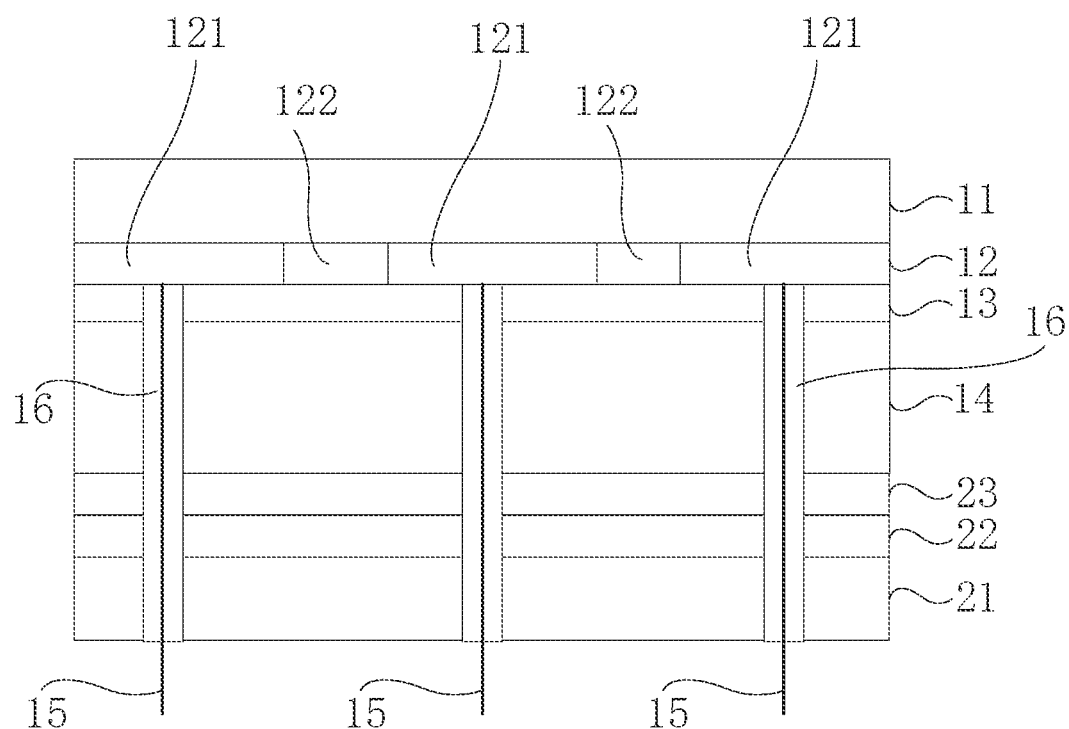
FIG. 12 is a left or right view of a structure of an electrochromic device with wires according to embodiment one of the present application.

Exemplarily, referring to FIG. 12, the structure obtained through step 140 and/or step 150 includes the first transparent substrate 11, the first transparent conductive layer 12, the ion storage layer 13, the ion transfer layer 14, the electrochromic layer 23, the second transparent conductive layer 22, and the second transparent substrate 21 which are sequentially stacked, where the first transparent conductive layer 12 includes the at least two first conductive portions 121, the second transparent conductive layer 22 includes the at least two second conductive portions, and the extension direction of the first conductive portion 121 and the extension direction of the second conductive portion are configured to intersect with each other; and a third groove 16 sequentially penetrates through the second transparent substrate 21, the second transparent conductive layer 22, the electrochromic layer 23, the ion transfer layer 14, and the ion storage layer 13 and reaches the first conductive portion 121, where a transparent wire 15 connected to the first conductive portion 121 through the third groove 16 is further included in the third groove 16.

Figure 13:
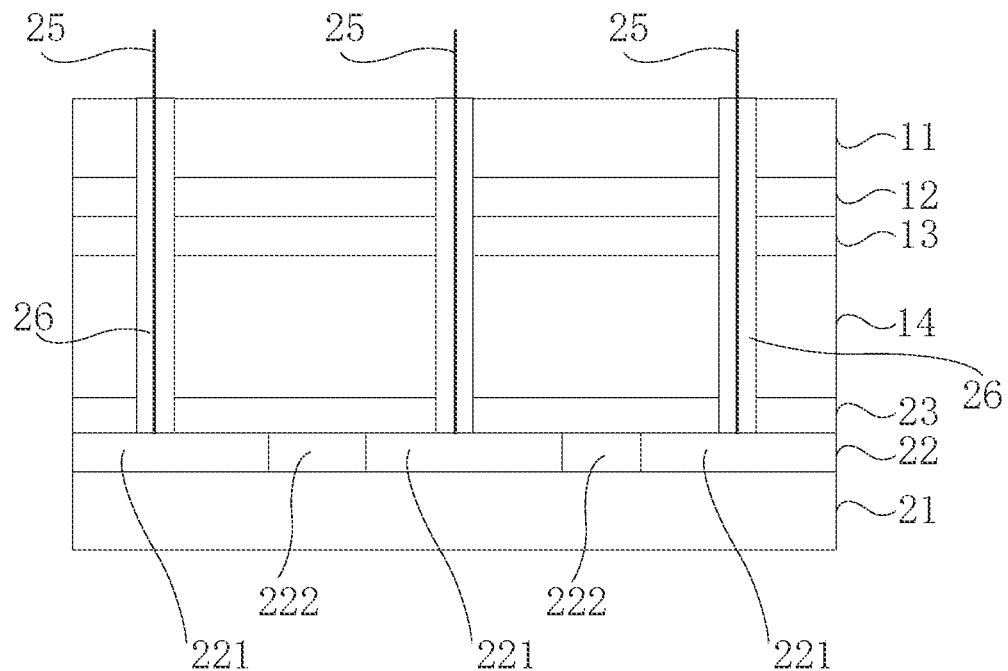
FIG. 13 is a left or right view of a structure of an electrochromic device with wires according to embodiment one of the present application.

Exemplarily, referring to FIG. 13, the structure obtained through step 140 and/or step 150 includes the first transparent substrate 11, the first transparent conductive layer 12, the ion storage layer 13, the ion transfer layer 14, the electrochromic layer 23, the second transparent conductive layer 22, and the second transparent substrate 21 which are sequentially stacked, where the first transparent conductive layer 12 includes the at least two first conductive portions 121, the second transparent conductive layer 22 includes the at least two second conductive portions, and the extension direction of the first conductive portion 121 and the extension direction of the second conductive portion are configured to intersect with each other; and a fourth groove 26 penetrates through the first transparent substrate 11, the first transparent conductive layer 12, the ion storage layer 13, the ion transfer layer 14, and the electrochromic layer 23 and reaching the second conductive portion 221, where a transparent wire 25 connected to the second conductive portion 221 through the fourth groove 26 is further included in the fourth groove 26.

Exemplarily, the structure obtained through step 140 and/or step 150 includes the first transparent substrate, the first transparent conductive layer, the ion storage layer, the ion transfer layer, the electrochromic layer, the second transparent conductive layer, and the second transparent substrate which are sequentially stacked, where the first transparent conductive layer includes the at least two first conductive portions, the second transparent conductive layer includes the at least two second conductive portions, and the extension direction of the first conductive portion and the extension direction of the second conductive portion are configured to intersect with each other; and the third groove sequentially penetrates through the second transparent substrate, the second transparent conductive layer, the electrochromic layer, the ion transfer layer, and the ion storage layer and reaches the first conductive portion, and the fourth groove penetrates through the first transparent substrate, the first transparent conductive layer, the ion storage layer, the ion transfer layer, and the electrochromic layer and reaches the second conductive portion, where the transparent wire connected to the first conductive portion through the groove is further included in the groove. The transparent wire connected to the first conductive portion through the groove is further included in the third groove and the fourth groove.

In this alternative embodiment, the first transparent substrate of the first subunit body further includes a transparent wire, and/or the second transparent substrate of the second subunit body further includes a transparent wire.

Figure 14:
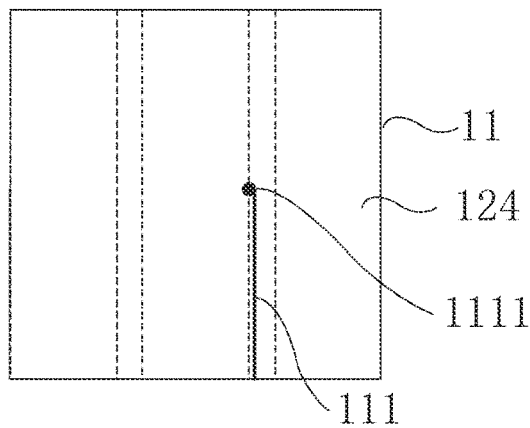
FIG. 14 is a structural diagram of a first transparent substrate with a transparent wire according to embodiment one of the present application.

Exemplarily, referring to FIG. 14, using an example in which the first transparent substrate 11 of the first subunit body further includes a transparent wire 111, a head 1111 of the transparent wire 111 is disposed at a preset position of a first conductive portion 124. After the first conductive portion is prepared, the first conductive portion may be connected to the transparent wire through the head 1111 of the transparent wire 111.

In this alternative embodiment, the first conductive portion is also connected to the transparent wire, and/or the second conductive portion is also connected to the transparent wire. When the first transparent substrate of the first subunit body further includes the transparent wire or the second transparent substrate of the second subunit body further includes the transparent wire, in step 110, the first conductive portions of the first subunit body and/or the second conductive portions of the second subunit body can be prepared only by the mask method.

Specifically, the transparent wire on the first transparent substrate or the transparent wire on the second transparent substrate may be prepared by the mask method. Before the first transparent conductive layer is prepared on the first transparent substrate by the mask method in step A1, a preset position of the transparent wire is covered with an insulating material, or before the second transparent conductive layer is prepared on the second transparent substrate by the mask method in step E1, a preset position of the transparent wire is covered with the insulating material, which can protect the transparent wire on the one hand and prevent the wire from conducting multiple first conductive portions or multiple second conductive portions on the other hand. The portion of the transparent wire connected to a preset first conductive portion or a preset second conductive portion is not covered with the insulating material.

In the embodiment of the present application, each first conductive portion is separately connected to at least one transparent wire, and each second conductive portion is separately connected to at least one transparent wire.

In the embodiment of the present application, the transparent wire may be led out from the outer side of the first conductive portion/the second conductive portion, which is a lead-out manner in the existing art. Alternatively, the transparent wire may be led out in the lead-out manner in the preceding alternative embodiment.

Optionally, one or more transparent wires may be connected to each first conductive portion. When multiple transparent wires are connected, a uniform color change effect of a local region corresponding to the first conductive portion can also be achieved.

Optionally, one or more transparent wires may be connected to each second conductive portion. When multiple transparent wires are connected, a uniform color change effect of a local region corresponding to the second conductive portion can also be achieved.

Embodiment Two

Figure 15:
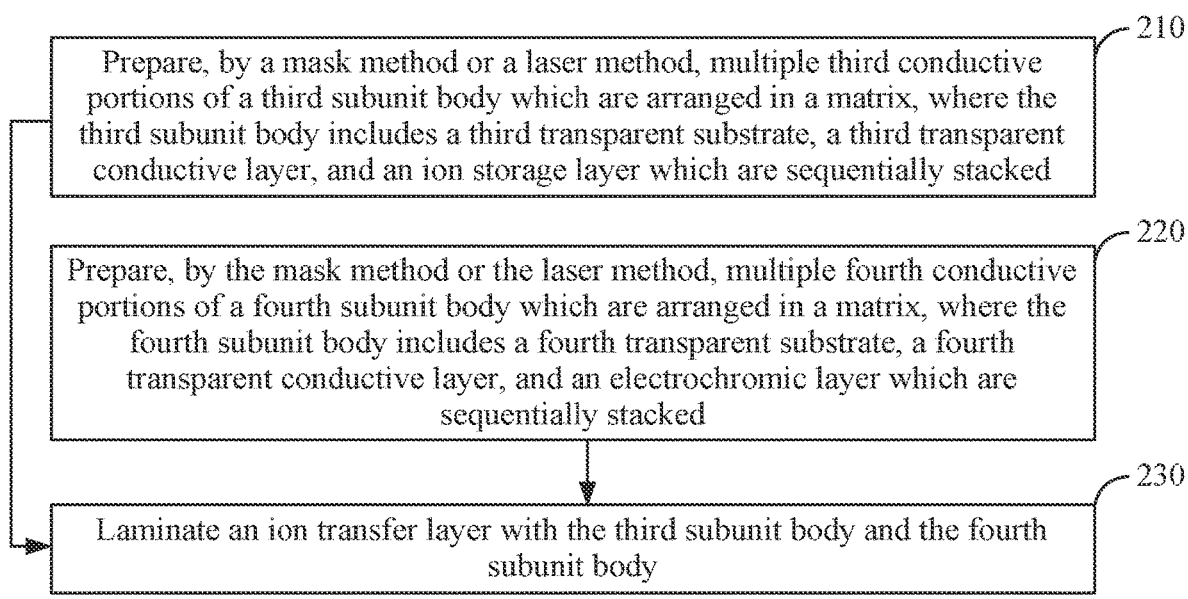
FIG. 15 is a flowchart of a method for preparing an electrochromic device according to embodiment two of the present application.

FIG. 15 is a flowchart of a method for preparing an electrochromic device according to embodiment two of the present application. The method specifically includes steps described below.

In step 210, multiple third conductive portions of a third subunit body which are arranged in a matrix are prepared by a mask method or a laser method, where the third subunit body includes a third transparent substrate, a third transparent conductive layer, and an ion storage layer which are sequentially stacked.

In this embodiment, the preparation of the multiple third conductive portions of the first subunit body which are arranged in the matrix by the mask method includes steps described below.

In step I1, the third transparent conductive layer is prepared on the third transparent substrate by the mask method, where the third transparent conductive layer includes the multiple third conductive portions arranged in the matrix.

In this step, specifically, the third transparent substrate is covered with a mask, and the third transparent conductive layer is formed by a magnetron sputtering method, vacuum vapor deposition, a sol-gel process, a chemical vapor deposition method, or the like. After the mask is removed, the multiple third conductive portions arranged in the matrix and a groove between two adjacent third conductive portions may be obtained.

Figure 16:
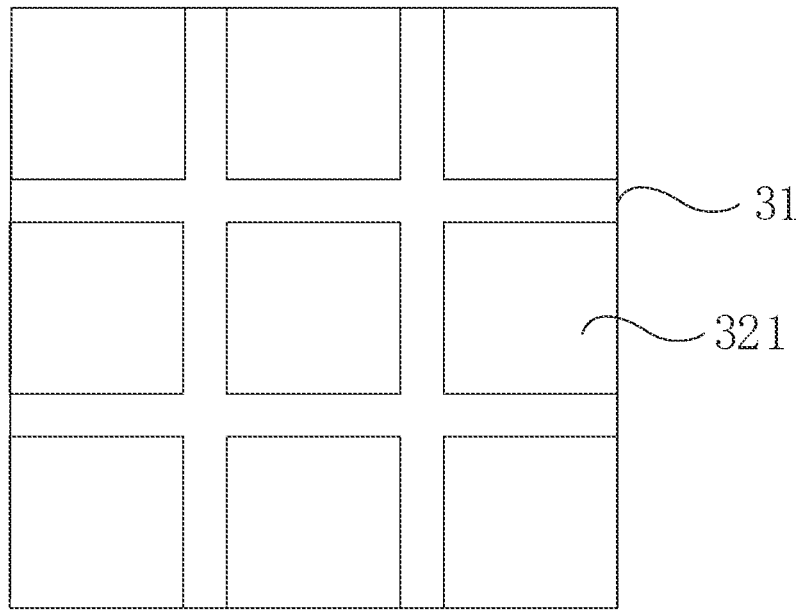
FIG. 16 is a top view of third conductive portions according to embodiment two of the present application.
Figure 17:
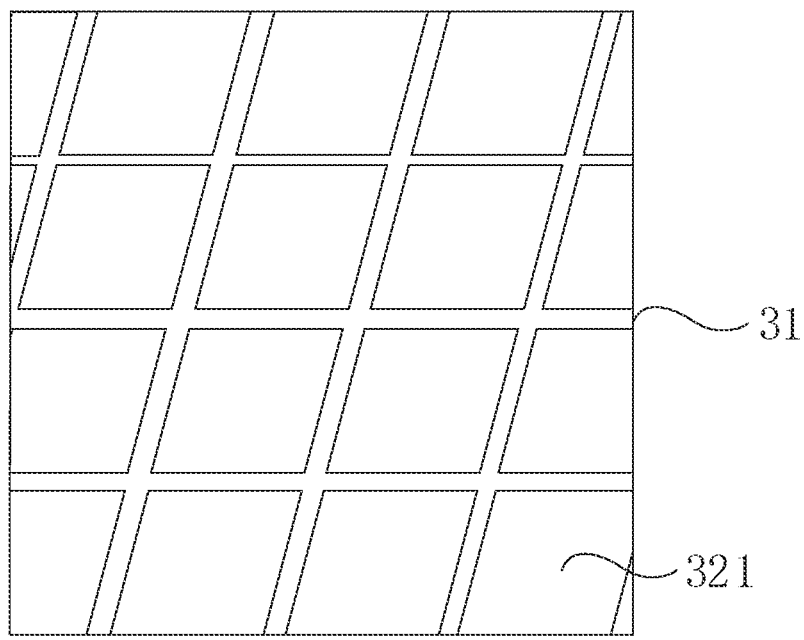
FIG. 17 is a top view of third conductive portions according to embodiment two of the present application.
Figure 18:
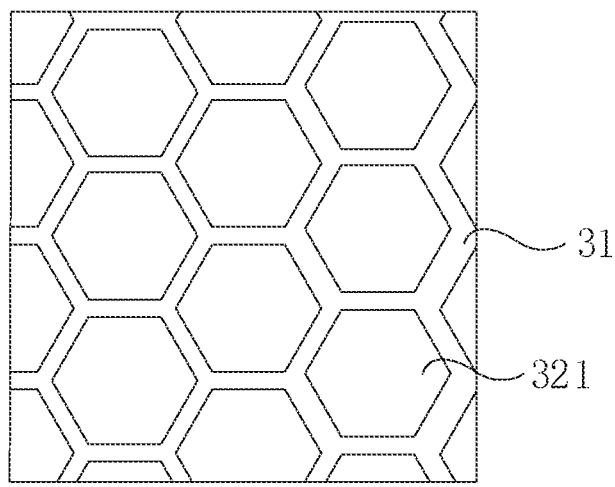
FIG. 18 is a top view of third conductive portions according to embodiment two of the present application.

In this step, reference is made to FIG. 16 which is a schematic diagram of the prepared multiple third conductive portions of the third subunit body which are arranged in the matrix, where the third conductive portions 321 are rectangular and uniformly distributed in the matrix on the third transparent substrate 31. In other embodiments, referring to FIG. 17, a third conductive portion 321 is a parallelogram, and referring to FIG. 18, a third conductive portion 321 is a regular hexagon, which is not limited here.

In other embodiments, the third transparent substrate may be covered with the mask, and the third transparent conductive layer and the ion storage layer are formed by the magnetron sputtering method, the vacuum vapor deposition, the sol-gel process, the chemical vapor deposition method, or the like. After the mask is removed, a groove penetrating through the third transparent conductive layer and the ion storage layer may be obtained, and the groove may further divide the third transparent conductive layer into the multiple third conductive portions arranged in the matrix.

In this step, specifically, the third transparent substrate is covered with the mask, and the third transparent conductive layer is formed by the magnetron sputtering method, the vacuum vapor deposition, the sol-gel process, the chemical vapor deposition method, or the like. After the mask is removed, the multiple third conductive portions arranged in the matrix and the groove between the two adjacent third conductive portions may be obtained.

In step I2, the ion storage layer is formed on the multiple third conductive portions arranged in the matrix.

Exemplarily, the ion storage layer may be formed on the multiple third conductive portions arranged in the matrix by a coating method.

Figure 19:
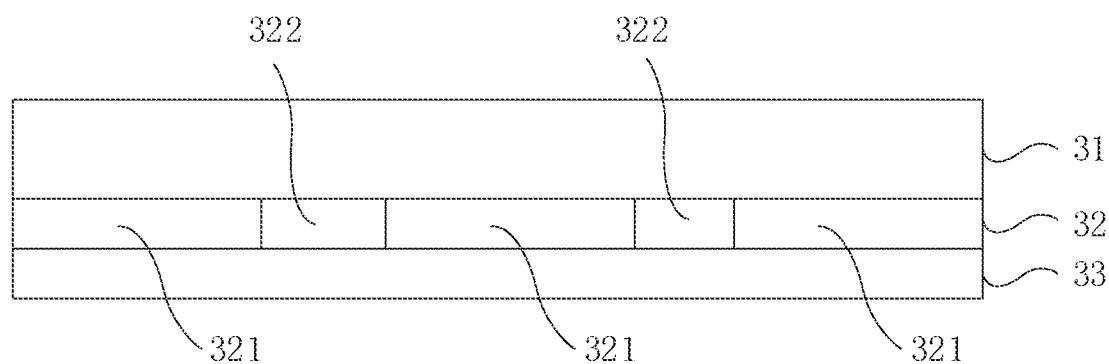
FIG. 19 is a structural diagram of a third subunit body with third conductive portions prepared according to embodiment two of the present application.

In this embodiment, referring to FIG. 19, the structure obtained through steps I1 to I3 includes a third transparent substrate 31, a third transparent conductive layer 32, and an ion storage layer 33 which are sequentially stacked, where the third transparent conductive layer 32 includes multiple third conductive portions 321 arranged in a matrix, and a groove 322 is further included between two adjacent third conductive portions 321.

In this embodiment, exemplarily, the preparation of the multiple third conductive portions of the third subunit body which are arranged in the matrix by the laser method includes steps described below.

In step J1, the third transparent conductive layer is prepared on the third transparent substrate.

In step J2, the third transparent conductive layer is cut by a laser such that the third transparent conductive layer is divided into the multiple third conductive portions arranged in the matrix.

In step J3, the ion storage layer is formed on the third conductive portions.

In this embodiment, the structure obtained through steps J1 to J3 is the same as the structure obtained through steps I1 and I2, and specifically, reference may be made to FIG. 19.

In this embodiment, exemplarily, the preparation of the multiple third conductive portions of the third subunit body which are arranged in the matrix by the laser method includes steps described below.

In step K1, the third transparent conductive layer is prepared on the third transparent substrate.

In step K2, the ion storage layer is formed on the third transparent conductive layer.

In step K3, the third transparent conductive layer and the ion storage layer are cut by the laser such that the third transparent conductive layer is divided into the multiple third conductive portions arranged in the matrix.

Figure 20:
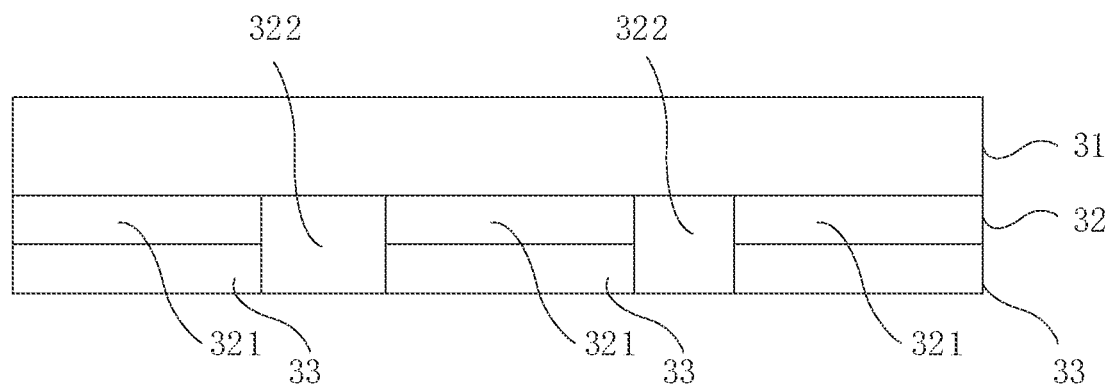
FIG. 20 is a structural diagram of a third subunit body with third conductive portions prepared according to embodiment two of the present application.

In this embodiment, referring to FIG. 20, the structure obtained through steps K1 to K3 includes the third transparent substrate 31, the third transparent conductive layer 32, and the ion storage layer 33 which are sequentially stacked, where the third transparent conductive layer 32 includes the multiple third conductive portions 321 arranged in the matrix, and the groove 322 is further included between the two adjacent third conductive portions 321. The groove 322 further penetrates through the ion storage layer 33. When a conductive portion is cut by the laser method and a conductive layer is relatively thin (having a thickness of 0.1 micrometer to 10 micrometers), it is difficult to adjust the accuracy of laser cutting. Therefore, the third transparent conductive layer and the ion storage layer are simultaneously cut by the laser so that the overall cutting thickness is increased, the difficulty of the laser cutting can be reduced, and the yield of the laser cutting can be improved.

In this embodiment, exemplarily, the preparation of the multiple third conductive portions of the third subunit body which are arranged in the matrix by the laser method includes a step described below.

In step L1, the third transparent substrate and the third transparent conductive layer are cut by the laser such that the third transparent conductive layer is divided into the multiple third conductive portions arranged in the matrix.

Figure 21:
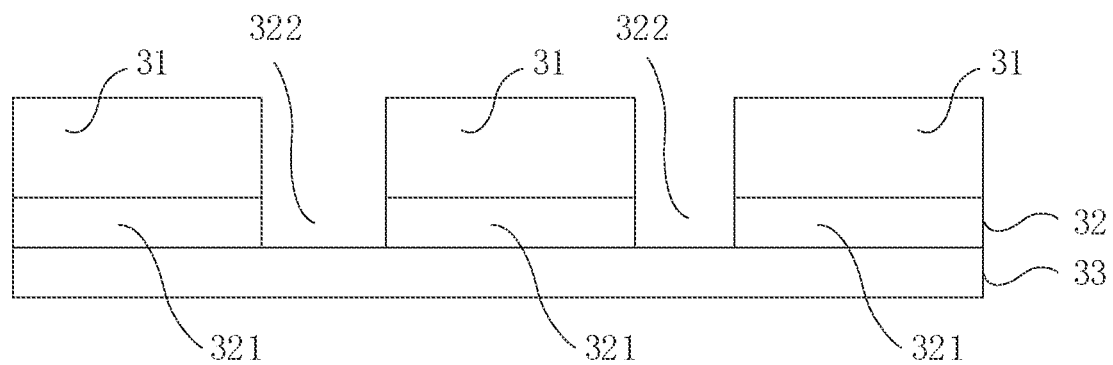
FIG. 21 is a structural diagram of a third subunit body with third conductive portions prepared according to embodiment two of the present application.

In this embodiment, referring to FIG. 21, the structure obtained through step L1 includes the third transparent substrate 31, the third transparent conductive layer 32, and the ion storage layer 33 which are sequentially stacked, where the third transparent conductive layer 32 includes the multiple third conductive portions 321 arranged in the matrix, and the groove 322 is further included between the two adjacent third conductive portions 321. The groove 322 further penetrates through the third transparent substrate 31. The third transparent conductive layer and the third transparent substrate are simultaneously cut by the laser so that the overall cutting thickness is increased, the difficulty of the laser cutting can be reduced, and the yield of the laser cutting can be improved. In other embodiments, the third transparent substrate, the third transparent conductive layer, and the ion storage layer may also be cut by the laser such that the third transparent conductive layer is divided into the at least two third conductive portions, and the groove between the two adjacent third conductive portions further penetrates through the third transparent substrate and the ion storage layer.

Alternatively, in step 220, multiple fourth conductive portions of a fourth subunit body which are arranged in a matrix are prepared by the mask method or the laser method, where the fourth subunit body includes a fourth transparent substrate, a fourth transparent conductive layer, and an electrochromic layer which are sequentially stacked.

In this embodiment, the preparation of the multiple fourth conductive portions of the fourth subunit body which are arranged in the matrix by the mask method includes steps described below.

In step M1, the fourth transparent conductive layer is prepared on the fourth transparent substrate by the mask method, where the fourth transparent conductive layer includes the multiple fourth conductive portions arranged in the matrix.

In this step, specifically, the fourth transparent substrate is covered with the mask, and the fourth transparent conductive layer is formed by the magnetron sputtering method, the vacuum vapor deposition, the sol-gel process, the chemical vapor deposition method, or the like. After the mask is removed, the multiple fourth conductive portions arranged in the matrix and the groove between the two adjacent fourth conductive portions may be obtained.

In step M2, the electrochromic layer is formed on the multiple fourth conductive portions arranged in the matrix.

Exemplarily, the electrochromic layer may be formed on the multiple fourth conductive portions arranged in the matrix by the coating method.

In this embodiment, referring to FIG. 44, the structure obtained through steps M1 to M4 includes a fourth transparent substrate 41, a fourth transparent conductive layer 42, and an electrochromic layer 43 which are sequentially stacked, where the fourth transparent conductive layer 42 includes multiple fourth conductive portions 421 arranged in a matrix, and a groove 422 is further included between two adjacent fourth conductive portions 421.

In other embodiments, the fourth transparent substrate may be covered with the mask, and the fourth transparent conductive layer and the electrochromic layer are formed by the magnetron sputtering method, the vacuum vapor deposition, the sol-gel process, the chemical vapor deposition method, or the like. After the mask is removed, a groove penetrating through the fourth transparent conductive layer and the electrochromic layer may be obtained, and the groove may further divide the fourth transparent conductive layer into the multiple fourth conductive portions arranged in the matrix.

In this embodiment, exemplarily, the preparation of the multiple fourth conductive portions of the fourth subunit body which are arranged in the matrix by the laser method includes steps described below.

In step N1, the fourth transparent conductive layer is prepared on the fourth transparent substrate.

In step N2, the fourth transparent conductive layer is cut by the laser such that the fourth transparent conductive layer is divided into the multiple fourth conductive portions arranged in the matrix.

In step N3, the electrochromic layer is formed on the fourth conductive portions.

Figure 22:
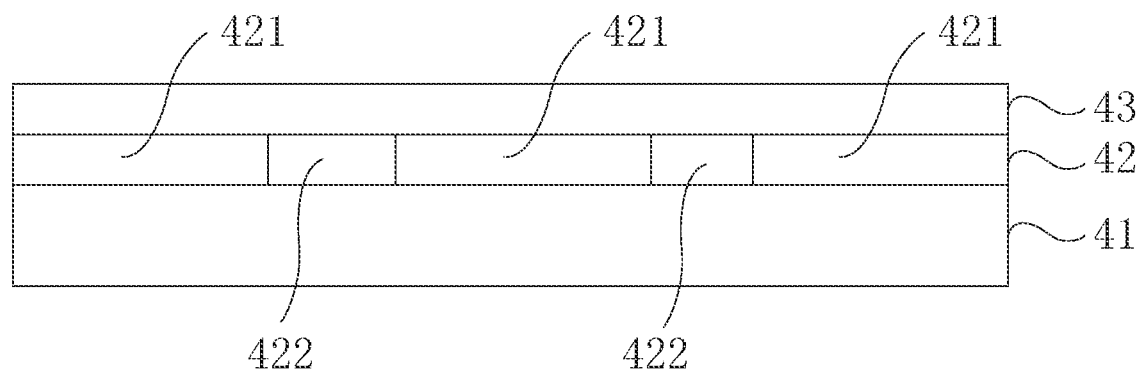
FIG. 22 is a structural diagram of a fourth subunit body with fourth conductive portions prepared according to embodiment two of the present application.

In this embodiment, the structure obtained through steps N1 to N3 is the same as the structure obtained through steps M1 and M2, and specifically, reference may be made to FIG. 22.

In this embodiment, exemplarily, the preparation of the multiple fourth conductive portions of the fourth subunit body which are arranged in the matrix by the laser method includes steps described below.

In step O1, the fourth transparent conductive layer is prepared on the fourth transparent substrate.

In step O2, the electrochromic layer is formed on the fourth transparent conductive layer.

In step O3, the fourth transparent conductive layer and the electrochromic layer are cut by the laser such that the fourth transparent conductive layer is divided into the multiple fourth conductive portions arranged in the matrix.

Figure 23:
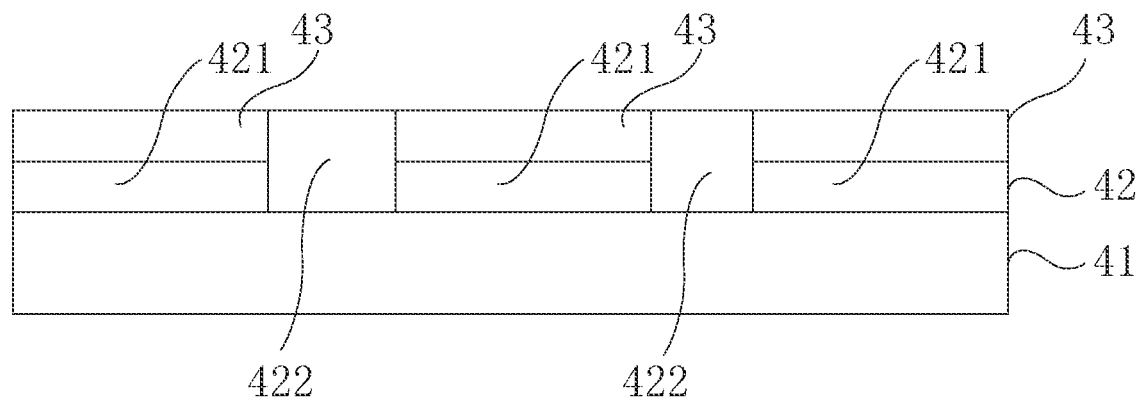
FIG. 23 is a structural diagram of a fourth subunit body with fourth conductive portions prepared according to embodiment two of the present application.

In this embodiment, referring to FIG. 23, the structure obtained through steps O1 to O3 includes the fourth transparent substrate 41, the fourth transparent conductive layer 42, and the electrochromic layer 43 which are sequentially stacked, where the fourth transparent conductive layer 42 includes the multiple fourth conductive portions 421 arranged in the matrix, and the groove 422 is further included between the two adjacent fourth conductive portions 421. The groove 422 further penetrates through the electrochromic layer 43. When a conductive portion is cut by the laser method and a conductive layer is relatively thin (having a thickness of 0.1 micrometer to 10 micrometers), it is difficult to adjust the accuracy of the laser cutting. Therefore, the fourth transparent conductive layer and the electrochromic layer are simultaneously cut by the laser so that the overall cutting thickness is increased, the difficulty of the laser cutting can be reduced, and the yield of the laser cutting can be improved.

In this embodiment, exemplarily, the preparation of the multiple fourth conductive portions of the fourth subunit body which are arranged in the matrix by the laser method includes a step described below.

In step P1, the fourth transparent substrate and the fourth transparent conductive layer are cut by the laser such that the fourth transparent conductive layer is divided into the multiple fourth conductive portions arranged in the matrix.

Figure 24:
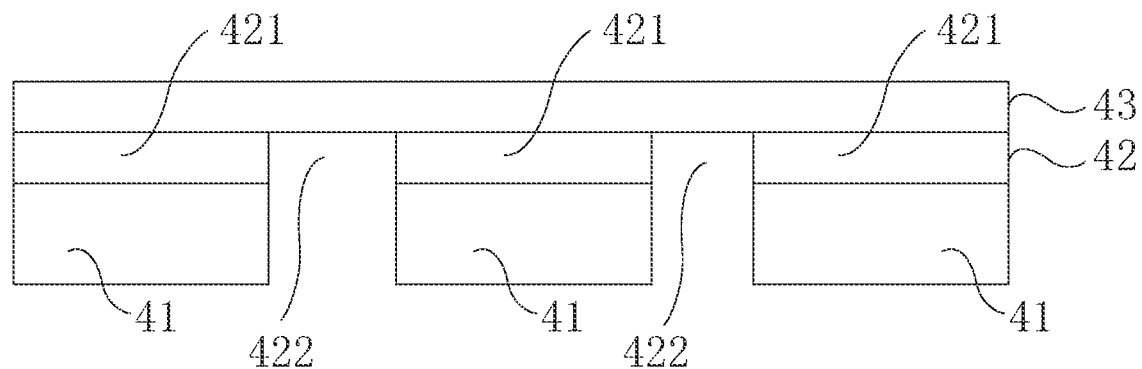
FIG. 24 is a structural diagram of a fourth subunit body with fourth conductive portions prepared according to embodiment two of the present application.

In this embodiment, referring to FIG. 24, the structure obtained through step P1 includes the fourth transparent substrate 41, the fourth transparent conductive layer 42, and the electrochromic layer 43 which are sequentially stacked, where the fourth transparent conductive layer 42 includes the multiple fourth conductive portions 421 arranged in the matrix, and the groove 422 is further included between the two adjacent fourth conductive portions 421. The groove 422 penetrates through the second transparent substrate 41. The fourth transparent conductive layer and the fourth transparent substrate are simultaneously cut by the laser so that the overall cutting thickness is increased, the difficulty of the laser cutting can be reduced, and the yield of the laser cutting can be improved. In other embodiments, the fourth transparent substrate, the fourth transparent conductive layer, and the electrochromic layer may also be cut by the laser such that the fourth transparent conductive layer is divided into the multiple fourth conductive portions arranged in the matrix, and the groove between the two adjacent fourth conductive portions further penetrates through the fourth transparent substrate and the electrochromic layer.

In step 230, an ion transfer layer is laminated with the third subunit body and the fourth subunit body.

In this step, the preceding ion transfer layer is a gel electrolyte layer, a liquid electrolyte layer, or a solid electrolyte layer. The preceding ion transfer layer is laminated with the third subunit body and the fourth subunit body in multiple manners. Exemplarily, an adhesive frame may be prepared on the ion storage layer of the third subunit body or the electrochromic layer of the fourth subunit body, and the third subunit body and the fourth subunit body may be bonded to each other and then a liquid or gel electrolyte may be injected. Alternatively, the ion transfer layer may be coated on the ion storage layer of the third subunit body, covered with the electrochromic layer of the fourth subunit body, and heated or subjected to an ultraviolet lamp to be solidified, and the solidified ion transfer layer may connect the third subunit body to the fourth subunit body. Alternatively, the ion transfer layer may be coated on the electrochromic layer of the fourth subunit body, covered with the ion storage layer of the third subunit body, and subjected to an ultraviolet lamp to be solidified, and the solidified ion transfer layer may connect the third subunit body to the fourth subunit body.

Figure 25:
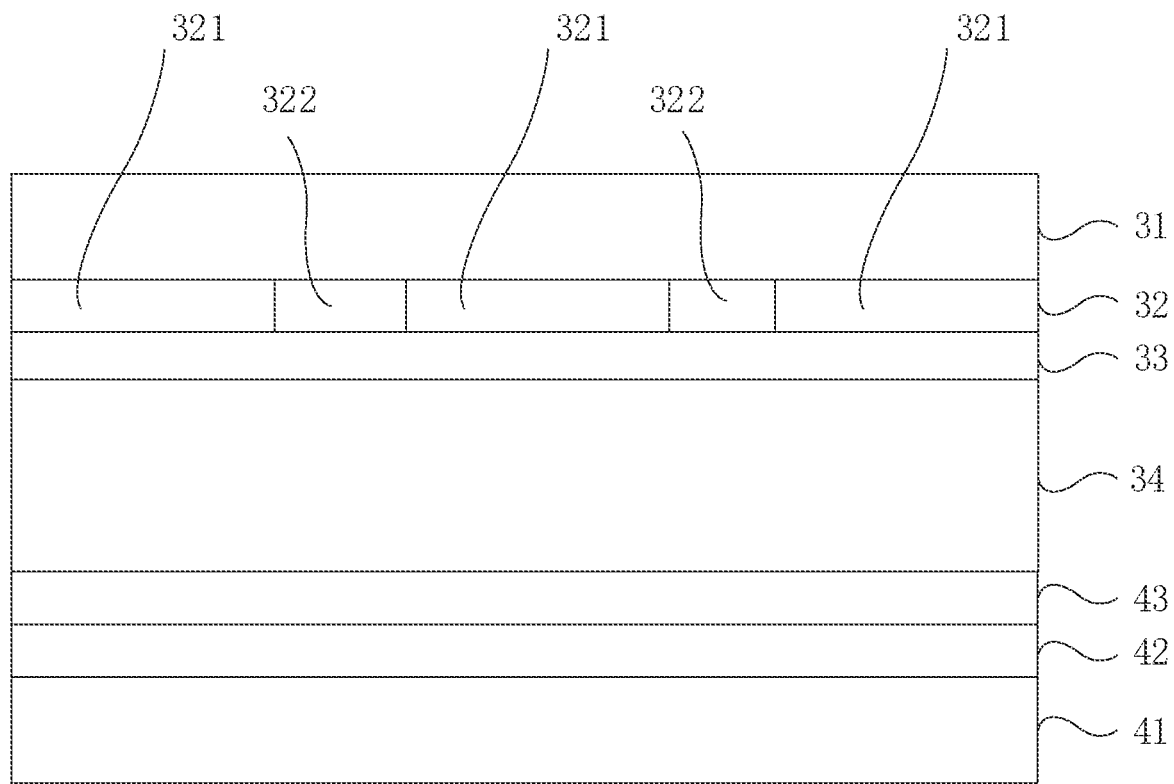
FIG. 25 is a structural diagram of an electrochromic device according to embodiment two of the present application.

Exemplarily, referring to FIG. 25, the structure obtained through step 210 and step 230 includes the third transparent substrate 31, the third transparent conductive layer 32, the ion storage layer 33, an ion transfer layer 34, the electrochromic layer 43, a fourth transparent conductive layer 42, and a fourth transparent substrate 41 which are sequentially stacked, where the third transparent conductive layer 32 includes the multiple third conductive portions 321 arranged in the matrix and the fourth transparent conductive layer 32 is a single conductive portion covering the fourth transparent substrate 42.

Figure 26:
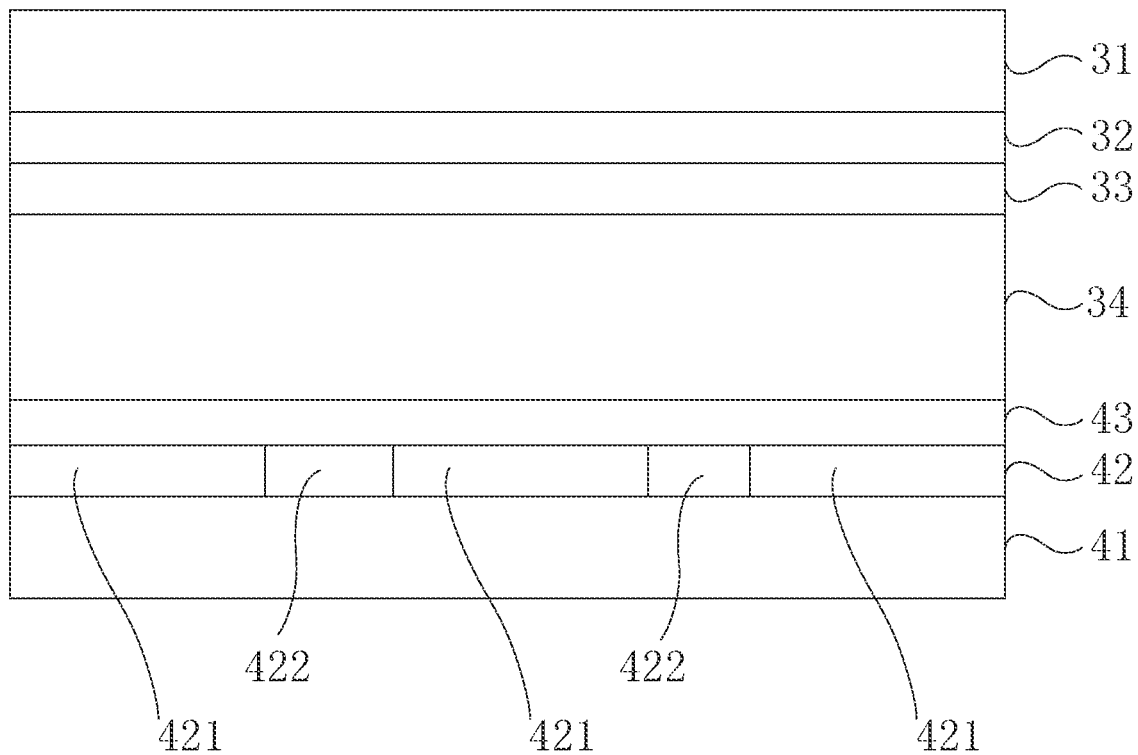
FIG. 26 is a structural diagram of an electrochromic device according to embodiment two of the present application.

Exemplarily, referring to FIG. 26, the structure obtained through step 220 and step 230 includes the third transparent substrate 31, the third transparent conductive layer 32, the ion storage layer 33, the ion transfer layer 34, the electrochromic layer 43, the fourth transparent conductive layer 42, and the fourth transparent substrate 41 which are sequentially stacked, where the third transparent conductive layer 32 is a single conductive portion covering the third transparent substrate 31 and the fourth transparent conductive layer 42 includes the multiple fourth conductive portions 421 arranged in the matrix.

In this embodiment, the third transparent conductive layer includes at least two third conductive portions. Optionally, the third transparent substrate includes at least two third transparent substrate region portions, where a projection of each third transparent substrate region portion on the third transparent conductive layer coincides with a respective third conductive portion; and/or the ion storage layer includes at least two ion storage region portions, where a projection of each ion storage region portion on the third transparent conductive layer coincides with a respective third conductive portion; and/or the ion transfer layer includes at least two ion transfer region portions, where a projection of each ion transfer region portion on the third transparent conductive layer coincides with a respective third conductive portion; and/or the electrochromic layer includes at least two electrochromic region portions, where a projection of each electrochromic region portion on the third transparent conductive layer coincides with a respective third conductive portion. In addition to the preceding structural design separately performed on the third transparent conductive layer, other structural layers of the electrochromic device of the present application may be further divided into region portions together or separately. Since a transparent conductive layer is generally relatively thin, a process of separately dividing an entire transparent conductive layer into at least two conductive portions requires relatively high accuracy. One or more layers close to the transparent conductive layer are also divided into portions, thereby greatly reducing the requirement on the accuracy of the process, facilitating the reduction of a manufacturing difficulty, and greatly improving the production efficiency of a product.

In this embodiment, step 210 and step 230 may be performed in any sequence; and step 220 and step 230 may also be performed in any sequence.

Exemplarily, step 230 may be performed before step 210 and/or step 220, where step 210 and step 220 may be performed sequentially or simultaneously.

Specifically, the ion transfer layer is laminated with the first subunit body and the fourth subunit body, where the third subunit body includes the third transparent substrate, the third transparent conductive layer, and the ion storage layer which are sequentially stacked; and the fourth subunit body includes the fourth transparent substrate, the fourth transparent conductive layer, and the electrochromic layer which are sequentially stacked. After the lamination, the formed structure includes the third transparent substrate, the third transparent conductive layer, the ion storage layer, the ion transfer layer, the electrochromic layer, the fourth transparent conductive layer, and the fourth transparent substrate which are sequentially stacked. Then, at least the third transparent substrate and the third transparent conductive layer of the third subunit body and the fourth transparent substrate and the fourth transparent conductive layer of the fourth subunit body are cut simultaneously or separately by the laser method. The structure formed after cutting by the laser method includes the first transparent substrate, the first transparent conductive layer, the ion storage layer, the ion transfer layer, the electrochromic layer, the fourth transparent conductive layer, and the fourth transparent substrate which are sequentially stacked, where the third transparent conductive layer includes the at least two third conductive portions, the fourth transparent conductive layer includes the at least two fourth conductive portions, and the extension direction of the third conductive portion and the extension direction of the fourth conductive portion are configured to intersect with each other. A third groove is included between the at least two third conductive portions, which further penetrates through the third transparent substrate of the third subunit body; and a fourth groove is further included between the at least two fourth conductive portions, which further penetrates through the fourth transparent substrate of the fourth subunit body.

In other embodiments, the third transparent substrate, the third transparent conductive layer, and the ion storage layer may be simultaneously cut when the third subunit body is cut by the laser method; and the fourth transparent substrate, the fourth transparent conductive layer, and the electrochromic layer may be cut simultaneously when the fourth subunit body is cut by the laser method. Therefore, the third groove may also penetrate through the third transparent substrate, the third transparent conductive layer, and the ion storage layer at the same time; and the third groove may also penetrate through the fourth transparent substrate, the fourth transparent conductive layer, and the electrochromic layer at the same time. In this embodiment, the groove is further included between the two adjacent third conductive portions, and in other embodiments, the groove between the at least two third conductive portions also penetrates through the third transparent substrate or the ion storage layer, which is not limited here.

In this embodiment, a third conductive portion or a fourth conductive portion has a shape with 4 to 16 sides, preferably a regular hexagon, a rectangle, a parallelogram, or the like. Different shapes are configured, which can meet different application requirements and achieve more diversified color change effects.

In this embodiment, the third transparent substrate and the fourth transparent substrate are each made of a flexible material or a rigid material. When the third transparent substrate and the fourth transparent substrate are each made of the flexible material, the entire electrochromic device may be arbitrarily bent and may be machined on a structure with a curved surface. Exemplarily, the curved surface is a surface of an ophthalmic lens.

Optionally, the third transparent conductive layer and the fourth transparent conductive layer each have a thickness of 3 micrometers to 300 micrometers, preferably 5 micrometers to 250 micrometers. The third transparent conductive layer and the fourth transparent conductive layer are each independently formed from indium tin oxide (ITO), aluminum zinc oxide (AZO), fluorine-doped tin oxide (FTO), silver nanowires, graphene, carbon nanotubes (CNTs), metal meshes, or silver nanoparticles.

In this embodiment, the ion storage layer has a thickness of 1 nanometer to 10000 nanometers. A material of the ion storage layer includes any one or a combination of at least two of oxides or complexes which are formed from metal elements in seven subgroups and group VIII and store ions during an electrochemical reaction. Preferably, the metal includes any one or a combination of at least two of titanium, vanadium, niobium, tantalum, chromium, molybdenum, tungsten, manganese, iron, cobalt, iridium, nickel, copper, or zinc. Preferably, the complex includes one or a combination of at least two of Prussian green, Prussian white, Prussian brown, Prussian blue, $KFeFe(CN)_6$, FeNiHCF, FeHCF, NiHCF, or aniron compound $XmYn\{Fe(CN)_6\}$, where X is $Na^+$ or $K^+$ and Y is $Fe^{3+}$, $Co^{3+}$, $Ni^+$, $Mn^{2+}$, $Zn^{2+}$, or $Cu^{2+}$. Exemplarily, the material of the ion storage layer may be a metal oxide, a combination of more than two preceding metal oxides, a metal complex, a combination of more than two preceding metal complexes, or a combination of a metal complex and a metal oxide.

In this embodiment, the electrochromic layer has a thickness of 1 nanometer to 10000 nanometers. A color change of the electrochromic layer may be adjusted according to the type of an electrochromic material. For example, the color change of the electrochromic layer may be a change between black and transparency, a change between black and red, a change between black and yellow, or the like. Preferably, the electrochromic layer is made of a material whose transparency is adjustable. A material of the electrochromic layer is selected from one or a combination of at least two of an electrochromic metal oxide such as a tungsten oxide, poly (decylviologen) and its derivatives, polyaniline and its derivatives, polypyrrole and its derivatives, polythiophene and its derivatives, poly(3,4-ethylenedioxythiophene) and its derivatives, poly(thieno[3,4-b][1,4]dioxepane) and its derivatives, polyfuran and its derivatives, polyfluorene and its derivatives, or polycarbazole and its derivatives and/or a copolymer formed by a monomer or an oligomer of the preceding polymer with an electron-deficient monomer. Preferably, the electron-deficient monomer includes any one or a combination of at least two of benzothiadiazole, benzoselenadiazole, benzoxazole, benzotriazole, benzimidazole, quinoxaline, or diketopyrrolopyrrole.

In this embodiment, the ion transfer layer has a thickness of 0.1 micrometer to 200 micrometers. The ion transfer layer is the gel electrolyte layer, the liquid electrolyte layer, or the solid electrolyte layer. Preferably, the ion transfer layer is the solid electrolyte layer.

In an alternative embodiment, after step 210, the following step is further included.

A transparent wire is prepared between the at least two third conductive portions, where the transparent wire is connected to at least one third conductive portion, or a transparent wire is prepared between the at least two fourth conductive portions, where the transparent wire is connected to at least one fourth conductive portion.

In this alternative embodiment, after the conductive portions are prepared, the transparent wire connected to the at least one third conductive portion or the at least one fourth conductive portion is prepared between the at least two third conductive portions or the at least two fourth conductive portions by the mask method. Specifically, the third subunit body or the fourth subunit body on which the multiple third conductive portions arranged in the matrix or the multiple fourth conductive portions arranged in the matrix have been prepared is covered with the mask, the transparent wire is prepared through the evaporation, and after the mask is removed, the transparent wire can be formed at a reserved position of the mask.

Figure 27:
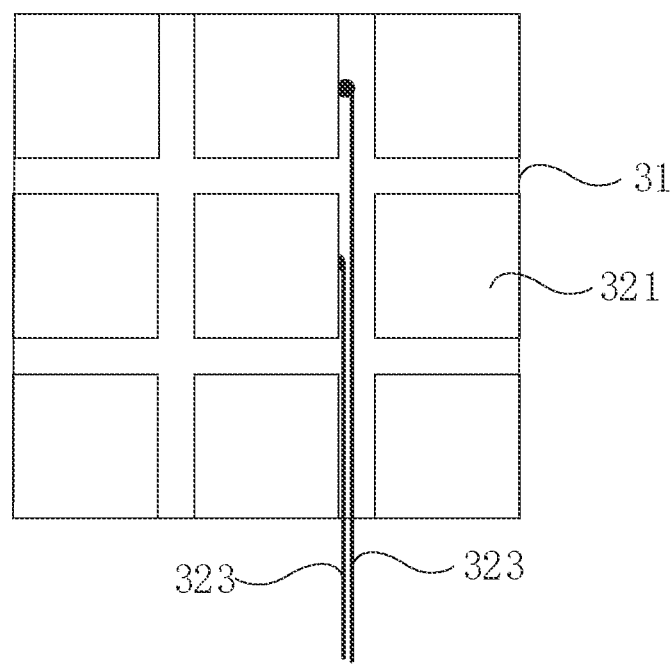
FIG. 27 is a top view of a structure of an electrochromic device with transparent wires prepared according to embodiment two of the present application.

In this alternative embodiment, exemplarily, referring to FIG. 27, the electrochromic device further includes the groove 322 between the at least two third conductive portions 321. The groove 322 is provided with at least one transparent wire 323, which is independent of each other and connected to a side face of the third conductive portion 321. A transparent wire 323 is formed in the groove 322 between the at least two third conductive portions 321, and an end of the transparent wire 323 is connected to the at least one third conductive portion 321.

Figure 28:
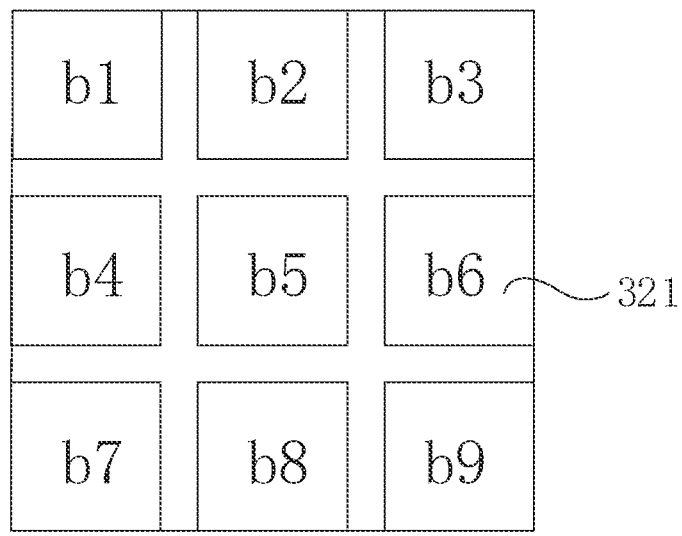
FIG. 28 is a top view of a structure of an electrochromic device according to embodiment two of the present application.

For example, referring to FIG. 28 which is a top view of the electrochromic device, if the electrochromic device is controlled to be bright in a local region, for example, regions b1, b2, b3, and b4 need to be controlled to be bright, the regions b1, b2, b3, and b4 are connected to a positive electrode (or a negative electrode) of a power supply through a respective transparent wire (not shown in the figure); and at the same time, the fourth transparent conductive layer is connected to the negative electrode (or the positive electrode) of the power supply.

According to the technical solution in this embodiment, the electrochromic device and the method for preparing the electrochromic device are provided. The third conductive portions arranged in the matrix and the integral fourth transparent conductive layer are disposed, thereby implementing a local color change of the electrochromic device and achieving the effect of adjusting local opacity. In addition, the position and area of a local color change region can be conveniently adjusted. Thus, the application of the electrochromic device to a system in which opacity is adjustable locally is facilitated.

In this alternative embodiment, the third transparent substrate of the third subunit body further includes a transparent wire, or the fourth transparent substrate of the fourth subunit body further includes a transparent wire.

Using an example in which the third transparent substrate 31 of the third subunit body further includes a transparent wire 311, a head 3111 of the transparent wire 311 is disposed at a preset position of a third conductive portion 324. After the third conductive portion is prepared, the third conductive portion may be connected to the transparent wire through the head 3111 of the transparent wire 311.

In this alternative embodiment, the third conductive portion is also connected to the transparent wire, or the fourth conductive portion is also connected to the transparent wire. When the third transparent substrate of the third subunit body further includes the transparent wire or the fourth transparent substrate of the fourth subunit body further includes the transparent wire, in step 210, the third conductive portions of the third subunit body can be prepared only by the mask method; and in step 220, the fourth conductive portions of the fourth subunit body can be prepared only by the mask method.

Specifically, the transparent wire on the third transparent substrate or the transparent wire on the fourth transparent substrate may be prepared by the mask method. Before the third transparent conductive layer is prepared on the third transparent substrate by the mask method in step I1, a preset position of the transparent wire is covered with an insulating material, or before the fourth transparent conductive layer is prepared on the fourth transparent substrate by the mask method in step M1, a preset position of the transparent wire is covered with the insulating material, which can protect the transparent wire on the one hand and prevent the wire from conducting the multiple third conductive portions or the multiple fourth conductive portions on the other hand. The portion of the transparent wire connected to a preset third conductive portion or a preset fourth conductive portion is not covered with the insulating material.

In the alternative embodiment, after step 210, step 220, or step 230, the following steps are further included.

In step 240, a groove penetrating through the fourth transparent substrate, the fourth transparent conductive layer, the electrochromic layer, the ion transfer layer, and the ion storage layer to the third conductive portion is prepared by the laser method, and a transparent wire is connected to the third conductive portion through the groove.

Alternatively, in step 250, a groove penetrating through the third transparent substrate, the third transparent conductive layer, the ion storage layer, the ion transfer layer, and the electrochromic layer and reaching the fourth conductive portion is prepared by the laser method, and a transparent wire is connected to the fourth conductive portion through the groove.

Figure 29:
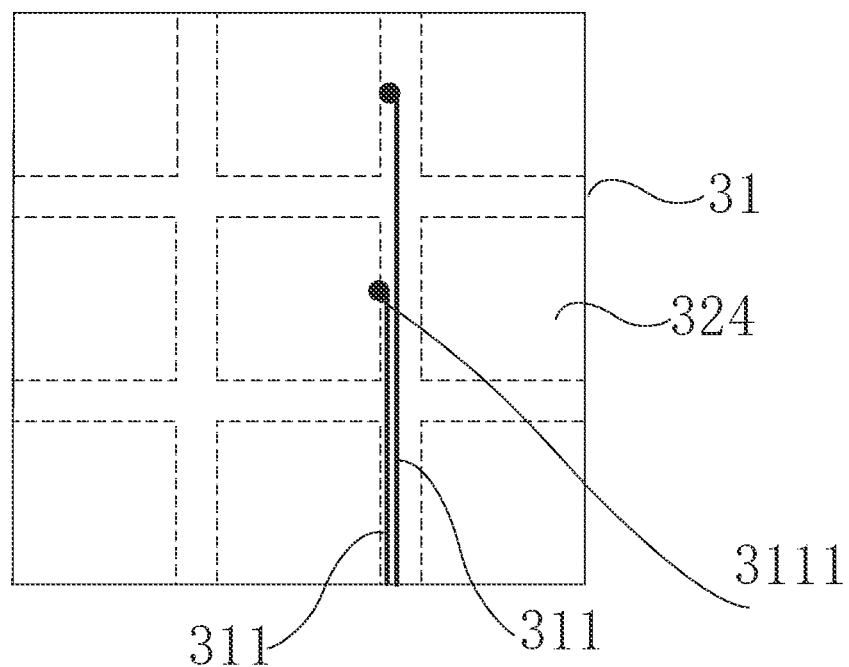
FIG. 29 is a structural diagram of a third transparent substrate with transparent wires according to embodiment two of the present application.
Figure 30:
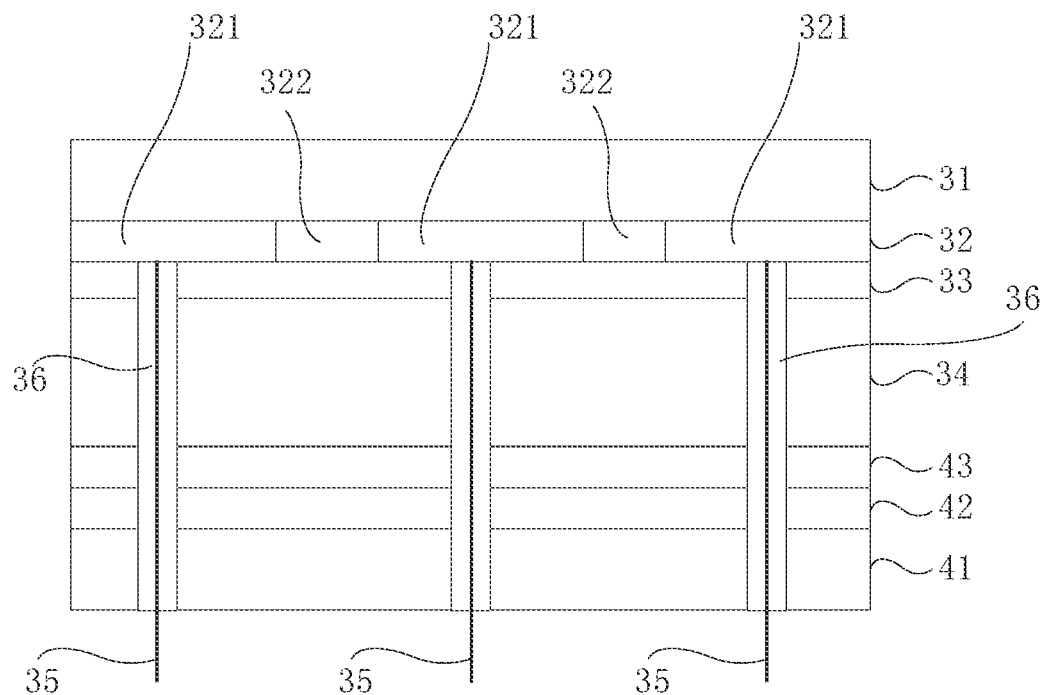
FIG. 30 is a front view of a structure of an electrochromic device with wires according to embodiment two of the present application.
Figure 31:
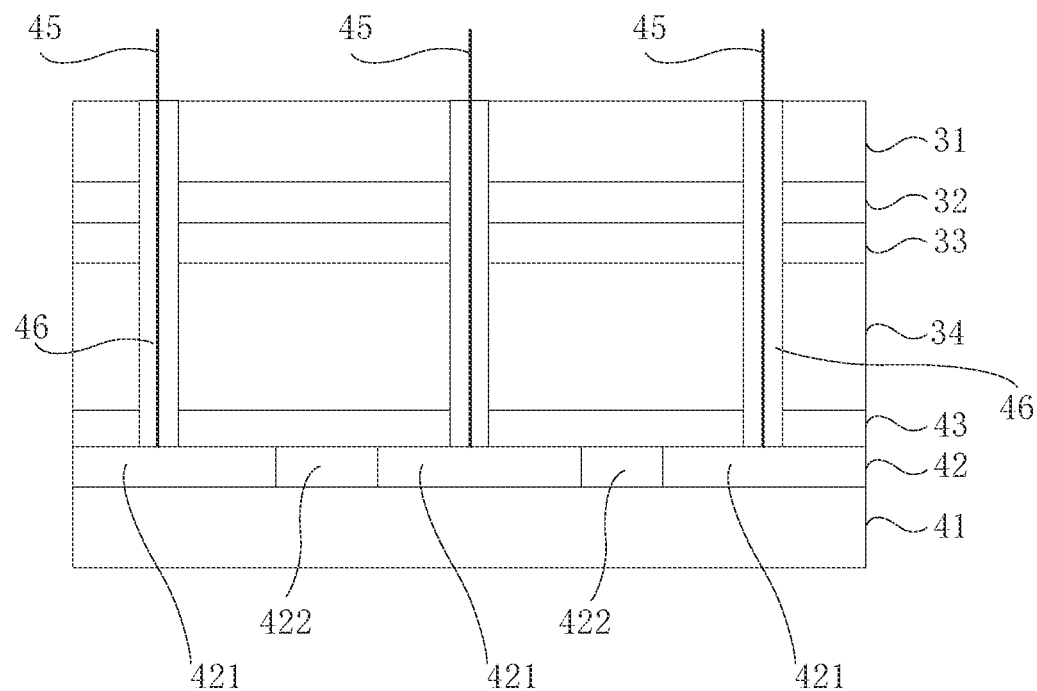
FIG. 31 is a front view of a structure of an electrochromic device with wires according to embodiment two of the present application.

Exemplarily, referring to FIG. 29, the structure obtained through step 240 and/or step 250 includes the third transparent substrate 31, the third transparent conductive layer 32, the ion storage layer 33, the ion transfer layer 34, the electrochromic layer 43, the fourth transparent conductive layer 42, and the fourth transparent substrate 41 which are sequentially stacked, where the third transparent conductive layer 32 includes the multiple third conductive portions 324 arranged in the matrix and the fourth transparent conductive layer 42 is the single conductive portion covering the fourth transparent substrate 41. The structure further includes a groove 36 penetrating through the fourth transparent substrate 41, the fourth transparent conductive layer 42, the electrochromic layer 43, the ion transfer layer 34, and the ion storage layer 33 and reaching the third conductive portion 321, and a transparent wire 35 connected to the third conductive portion 321 is further included in the groove 36.

Exemplarily, referring to FIG. 29, the structure obtained through step 240/step 250 includes the third transparent substrate 31, the third transparent conductive layer 32, the ion storage layer 33, the ion transfer layer 34, the electrochromic layer 43, the fourth transparent conductive layer 42, and the fourth transparent substrate 41 which are sequentially stacked, where the third transparent conductive layer 32 is a single conductive portion covering the third transparent substrate 31 and the fourth transparent conductive layer 42 includes the multiple fourth conductive portions 421 arranged in the matrix. The structure further includes a groove 46 penetrating through the third transparent substrate 31, the third transparent conductive layer 32, the ion storage layer 33, the ion transfer layer 34, and the electrochromic layer 43 and reaching the fourth conductive portion 421, and a transparent wire 45 connected to a fourth conductive portion 421 is further included in the groove 46.

Embodiment Three

In embodiment three, an electronic display device is provided. The electronic display device includes the structure of any one of the preceding electrochromic devices.

In this embodiment, the structure of the electrochromic device may be any subunit body, any intermediate structure during the preparation of a subunit body, a structure of any electrochromic device, or any intermediate structure during the preparation of an electrochromic device. The electronic display device includes, but is not limited to, sunglasses, ski goggles, a VR/AR device, glasses, goggles, a magnifier, a rear-view mirror, a curtain wall, architectural glass, a display screen, an electronic book, or the like, each of which includes the electrochromic device in the present application. The electrochromic device prepared according to the present application may be attached to a display interface of the preceding electronic display device as required. Since the electrochromic device prepared according to the present application can conveniently adjust the position and area of a local color change region, the electronic display device, a downstream product prepared with the electrochromic device, also has this advantage. The position and area of a color change region of the electronic display device may be adjusted according to the requirements of a specific scenario. In the present application, application scenarios are not described in detail one by one here. An example scenario is that some regions are adjusted to be transparent for displaying a real environment, and some regions are adjusted to be opaque for displaying virtual information. Another example scenario is that some regions are adjusted to a first color (a dark color) and some regions are adjusted to a second color (a light color) so that a user can focus on the environment corresponding to the second color.

What is claimed is:

1. An electrochromic device, comprising a first transparent substrate, a first transparent conductive layer, an ion storage layer, an ion transfer layer, an electrochromic layer, a second transparent conductive layer, and a second transparent substrate which are sequentially stacked, wherein the first transparent conductive layer comprises at least two first conductive portions, the second transparent conductive layer comprises at least two second conductive portions, and an extension direction of the at least two first conductive portions and an extension direction of the at least two second conductive portions are configured to intersect with each other;

a groove penetrating through the first transparent substrate, the first transparent conductive layer, the electrochromic layer, the ion transfer layer, and the ion storage layer and reaching one second conductive portion is disposed, and a transparent wire connected to one second conductive portion is further comprised in the groove penetrating through the first transparent substrate, the first transparent conductive layer, the electrochromic layer, the ion transfer layer, and the ion storage layer and reaching one second conductive portion; and/or a groove penetrating through the second transparent substrate, the second transparent conductive layer, the ion storage layer, the ion transfer layer, and the electrochromic layer and reaching one first conductive portion is disposed, and a transparent wire connected to one first conductive portion is further comprised in the groove penetrating through the second transparent substrate, the second transparent conductive layer, the ion storage layer, the ion transfer layer, and the electrochromic layer and reaching one first conductive portion.

2. The electrochromic device according to claim 1, wherein each first conductive portion among the at least two first conductive portions is separately connected to at least one transparent wire, and each second conductive portion among the at least two second conductive portions is separately connected to at least one transparent wire.

3. The electrochromic device according to claim 2, wherein the at least one transparent wire connected to the each first conductive portion is led out from an outer edge of the each first conductive portion, and/or the at least one transparent wire connected to the each second conductive portion is led out from an outer edge of the each second conductive portion.

4. The electrochromic device according to claim 3, further comprising a groove between the at least two first conductive portions and/or between the at least two second conductive portions, wherein at least one transparent wire is further disposed in the groove between the at least two first conductive portions and/or between the at least two second conductive portions, and the at least one transparent wire is connected to a side face of the first conductive portion and/or the second conductive portion.

5. The electrochromic device according to claim 2, further comprising a groove between the at least two first conductive portions and/or between the at least two second conductive portions, wherein at least one transparent wire is further disposed in the groove between the at least two first conductive portions and/or between the at least two second conductive portions, and the at least one transparent wire is connected to a side face of the first conductive portion and/or the second conductive portion.

6. The electrochromic device according to claim 1, further comprising a groove between the at least two first conductive portions and/or between the at least two second conductive portions, wherein at least one transparent wire is further disposed in the groove between the at least two first conductive portions and/or between the at least two second conductive portions, and the at least one transparent wire is connected to a side face of the first conductive portion and/or the second conductive portion.

7. A method for preparing an electrochromic device, comprising:

preparing at least two first conductive portions of a first subunit body by a mask method or a laser method, wherein the first subunit body comprises a first transparent substrate, a first transparent conductive layer, and an ion storage layer which are sequentially stacked;

preparing at least two second conductive portions of a second subunit body by the mask method or the laser method, wherein the second subunit body comprises an electrochromic layer, a second transparent conductive layer, and a second transparent substrate which are sequentially stacked; and laminating an ion transfer layer with the first subunit body and the second subunit body;

wherein an extension direction of the at least two first conductive portions of the first subunit body and an extension direction of the at least two second conductive portions of the second subunit body are configured to intersect with each other;

the method for preparing the electrochromic device further comprises:

preparing at least one transparent wire connected to a respective first conductive portion among the at least two first conductive portions, and preparing at least one transparent wire connected to a respective second conductive portion among the at least two second conductive portions;

wherein preparing the at least one transparent wire connected to the respective first conductive portion, and preparing the at least one transparent wire connected to the respective second conductive portion comprises:

preparing, by the laser method, a groove penetrating through the second transparent substrate, the second transparent conductive layer, the electrochromic layer, the ion transfer layer, and the ion storage layer and reaching one first conductive portion, and connecting a transparent wire to the one first conductive portion through the groove; and/or preparing, by the laser method, a groove penetrating through the first transparent substrate, the first transparent conductive layer, the ion storage layer, the ion transfer layer and the electrochromic layer and reaching one second conductive portion, and connecting a transparent wire to the one second conductive portion through the groove.

8. An electrochromic device, comprising a third transparent substrate, a third transparent conductive layer, an ion storage layer, an ion transfer layer, an electrochromic layer, a fourth transparent conductive layer, and a fourth transparent substrate which are sequentially stacked, wherein the third transparent conductive layer comprises a plurality of third conductive portions arranged in a matrix and the fourth transparent conductive layer is a single conductive portion covering the fourth transparent substrate, or the third transparent conductive layer is a single conductive portion covering the third transparent substrate and the fourth transparent conductive layer comprises a plurality of fourth conductive portions arranged in a matrix;

the electrochromic device further comprises:

a groove penetrating through the fourth transparent substrate, the fourth transparent conductive layer, the electrochromic layer, the ion transfer layer, and the ion storage layer and reaching one third conductive portion among the plurality of third conductive portions, wherein a transparent wire connected to the one third conductive portion is further comprised in the groove penetrating through the fourth transparent substrate, the fourth transparent conductive layer, the electrochromic layer, the ion transfer layer, and the ion storage layer and reaching one third conductive portion; or a groove penetrating through the third transparent substrate, the third transparent conductive layer, the ion storage layer, the ion transfer layer, and the electrochromic layer and reaching one fourth conductive portion among the plurality of fourth conductive portions, wherein a transparent wire connected to the one fourth conductive portion is further comprised in the groove penetrating through the third transparent substrate, the third transparent conductive layer, the ion storage layer, the ion transfer layer, and the electrochromic layer and reaching one fourth conductive portion.

9. The electrochromic device according to claim 8, further comprising a groove between at least two third conductive portions among the plurality of third conductive portions or between at least two fourth conductive portions among the plurality of fourth conductive portions.

10. A method for preparing the electrochromic device, wherein the electrochromic device comprises a third transparent substrate, a third transparent conductive layer, an ion storage layer, an ion transfer layer, an electrochromic layer, a fourth transparent conductive layer, and a fourth transparent substrate which are sequentially stacked, wherein the third transparent conductive layer comprises a plurality of third conductive portions arranged in a matrix and the fourth transparent conductive layer is a single conductive portion covering the fourth transparent substrate, or the third transparent conductive layer is a single conductive portion covering the third transparent substrate and the fourth transparent conductive layer comprises a plurality of fourth conductive portions arranged in a matrix;

the electrochromic device further comprises:

a groove penetrating through the fourth transparent substrate, the fourth transparent conductive layer, the electrochromic layer, the ion transfer layer, and the ion storage layer and reaching one third conductive portion among the plurality of third conductive portions, wherein a transparent wire connected to the one third conductive portion is further comprised in the groove penetrating through the fourth transparent substrate, the fourth transparent conductive layer, the electrochromic layer, the ion transfer layer, and the ion storage layer and reaching one third conductive portion; or a groove penetrating through the third transparent substrate, the third transparent conductive layer, the ion storage layer, the ion transfer layer, and the electrochromic layer and reaching one fourth conductive portion among the plurality of fourth conductive portions, wherein a transparent wire connected to the one fourth conductive portion is further comprised in the groove penetrating through the third transparent substrate, the third transparent conductive layer, the ion storage layer, the ion transfer layer, and the electrochromic layer and reaching one fourth conductive portion;

the method for preparing the electrochromic device comprises:

preparing, by a mask method or a laser method, a plurality of third conductive portions of a third subunit body which are arranged in a matrix, wherein the third subunit body comprises a third transparent substrate, a third transparent conductive layer, and an ion storage layer which are sequentially stacked; or preparing, by a mask method or a laser method, a plurality of fourth conductive portions of a fourth subunit body which are arranged in a matrix, wherein the fourth subunit body comprises a fourth transparent substrate, a fourth transparent conductive layer, and an electrochromic layer which are sequentially stacked; and laminating an ion transfer layer with the third subunit body and the fourth subunit body;

the method for preparing the electrochromic device further comprises:

preparing at least one transparent wire connected to a respective third conductive portion among the plurality of third conductive portions, and preparing at least one transparent wire connected to a respective fourth conductive portion among the plurality of fourth conductive portions;

wherein preparing the at least one transparent wire connected to a respective third conductive portion among the plurality of third conductive portions, and preparing the at least one transparent wire connected to a respective fourth conductive portion among the plurality of fourth conductive portions comprises:

preparing, by the laser method, a groove penetrating through the fourth transparent substrate, the fourth transparent conductive layer, the electrochromic layer, the ion transfer layer, and the ion storage layer and reaching one third conductive portion, and connecting a transparent wire which passes through the groove penetrating through the fourth transparent substrate, the fourth transparent conductive layer, the electrochromic layer, the ion transfer layer, and the ion storage layer and reaching one third conductive portion, to the third conductive portion; or preparing, by the laser method, a groove penetrating through the third transparent substrate, the third transparent conductive layer, the ion storage layer, the ion transfer layer, and the electrochromic layer and reaching one fourth conductive portion, and connecting a transparent wire which passes through the groove penetrating through the third transparent substrate, the third transparent conductive layer, the ion storage layer, the ion transfer layer, and the electrochromic layer and reaching one fourth conductive portion, to the fourth conductive portion.

* * * * *